(12) United States Patent
Johansson et al.

(10) Patent No.: US 10,356,069 B2
(45) Date of Patent: *Jul. 16, 2019

(54) TWO FACTOR AUTHENTICATION WITH AUTHENTICATION OBJECTS

(71) Applicant: Amazon Technologies, Inc., Seattle, WA (US)

(72) Inventors: Jesper Mikael Johansson, Redmond, WA (US); Gregory Branchek Roth, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/042,071

(22) Filed: Feb. 11, 2016

(65) Prior Publication Data

US 2016/0164855 A1 Jun. 9, 2016

Related U.S. Application Data

(63) Continuation of application No. 14/316,691, filed on Jun. 26, 2014, now Pat. No. 9,264,419.

(51) Int. Cl.
*G09C 1/00* (2006.01)
*H04L 9/32* (2006.01)
*H04L 29/06* (2006.01)

(52) U.S. Cl.
CPC .............. *H04L 63/08* (2013.01); *G09C 1/00* (2013.01); *H04L 9/3215* (2013.01); *H04L 9/3226* (2013.01); *H04L 9/3234* (2013.01); *H04L 9/3278* (2013.01); *H04L 63/0853* (2013.01); *H04L 2463/082* (2013.01)

(58) Field of Classification Search
CPC ..... H04L 63/08; H04L 9/3215; H04L 9/3234; H04L 9/3278; H04L 63/0853; G09C 1/00
See application file for complete search history.

(56) References Cited

U.S. PATENT DOCUMENTS

| | | |
|---|---|---|
| 4,993,068 A | 2/1991 | Piosenka et al. |
| 6,256,737 B1 | 7/2001 | Bianco et al. |
| 6,275,935 B1 | 8/2001 | Barlow et al. |
| 6,590,568 B1 | 7/2003 | Astala et al. |
| 6,633,905 B1 | 10/2003 | Anderson et al. |
| 6,914,985 B1 | 7/2005 | Shrader et al. |
| 7,039,951 B1 | 5/2006 | Chaudhari et al. |

(Continued)

OTHER PUBLICATIONS

Bhat et al., "Formal Verification of Safety Properties for Ownership Authentication Transfer Protocol," 2013, 16 pages.

(Continued)

*Primary Examiner* — Techane Gergiso
(74) *Attorney, Agent, or Firm* — Davis Wright Tremaine LLP

(57) ABSTRACT

Representations of authentication objects are provided for selection via an interface. An authentication object may be generated to include information obtained from one or more sensors of a device. A selected authentication object may contain information sufficient for authentication with a corresponding system. The interface may provide multiple representations of authentication objects that are usable with different service providers. The interface, executed by a first device, may be configured to authenticate a second device.

23 Claims, 11 Drawing Sheets

(56) References Cited

U.S. PATENT DOCUMENTS

| | | | |
|---|---|---|---|
| 7,137,008 B1 | 11/2006 | Hamid et al. | |
| 7,441,263 B1* | 10/2008 | Bakshi | G06F 21/335 709/223 |
| 7,464,403 B2 | 12/2008 | Hardman, Jr. | |
| 7,757,088 B2 | 7/2010 | Abdulhayoglu et al. | |
| 8,150,769 B2 | 4/2012 | Gupta et al. | |
| 8,424,079 B2 | 4/2013 | Adams et al. | |
| 8,490,868 B1 | 7/2013 | Kropf et al. | |
| 8,554,675 B2 | 10/2013 | Gupta et al. | |
| 8,626,665 B2 | 1/2014 | Bui et al. | |
| 8,788,324 B1 | 7/2014 | Shetty et al. | |
| 8,799,656 B2 | 8/2014 | Brickell et al. | |
| 8,850,304 B2 | 9/2014 | Ye et al. | |
| 8,869,235 B2 | 10/2014 | Qureshi et al. | |
| 8,935,769 B2* | 1/2015 | Hessler | H04L 63/0869 713/171 |
| 9,143,319 B2 | 9/2015 | Lambert | |
| 9,143,530 B2 | 9/2015 | Qureshi et al. | |
| 9,202,059 B2 | 12/2015 | Bhansali et al. | |
| 9,250,811 B1 | 2/2016 | Patiejunas | |
| 9,270,663 B2 | 2/2016 | Kravitz et al. | |
| 2002/0048369 A1 | 4/2002 | Ginter et al. | |
| 2002/0053021 A1 | 5/2002 | Rice et al. | |
| 2003/0149882 A1 | 8/2003 | Hamid | |
| 2003/0154406 A1* | 8/2003 | Honarvar | G06Q 10/10 726/10 |
| 2003/0163739 A1* | 8/2003 | Armington | G06F 21/32 726/3 |
| 2004/0015702 A1 | 1/2004 | Mercredi et al. | |
| 2004/0044739 A1 | 3/2004 | Ziegler | |
| 2004/0187018 A1* | 9/2004 | Owen | G06F 21/31 713/184 |
| 2004/0193485 A1 | 9/2004 | Ilberg | |
| 2004/0245330 A1 | 12/2004 | Swift et al. | |
| 2005/0077349 A1 | 4/2005 | Bonalle et al. | |
| 2005/0119978 A1 | 6/2005 | Ates | |
| 2005/0149739 A1 | 7/2005 | Hopkins et al. | |
| 2006/0021003 A1* | 1/2006 | Fisher | G06F 21/32 726/1 |
| 2006/0053293 A1 | 3/2006 | Zager et al. | |
| 2006/0156385 A1* | 7/2006 | Chiviendacz | G06F 21/36 726/2 |
| 2007/0186106 A1* | 8/2007 | Ting | H04L 63/0815 713/168 |
| 2007/0234408 A1* | 10/2007 | Burch | G06F 21/31 726/6 |
| 2007/0261109 A1 | 11/2007 | Renaud et al. | |
| 2008/0028453 A1* | 1/2008 | Nguyen | G06F 21/335 726/9 |
| 2008/0046982 A1* | 2/2008 | Parkinson | H04L 9/0891 726/5 |
| 2008/0115198 A1 | 5/2008 | Hsu et al. | |
| 2008/0115208 A1 | 5/2008 | Lee | |
| 2008/0126428 A1 | 5/2008 | Swanburg | |
| 2008/0126966 A1 | 5/2008 | Grossman | |
| 2008/0189214 A1 | 8/2008 | Mueller et al. | |
| 2008/0208759 A1 | 8/2008 | Royyuru | |
| 2008/0307223 A1 | 12/2008 | Brickell et al. | |
| 2009/0106680 A1 | 4/2009 | Brownholtz et al. | |
| 2009/0172793 A1 | 7/2009 | Newstadt et al. | |
| 2009/0274384 A1 | 11/2009 | Jakobovits | |
| 2009/0292919 A1 | 11/2009 | England | |
| 2010/0076890 A1 | 3/2010 | Low et al. | |
| 2010/0242106 A1* | 9/2010 | Harris | H04L 63/08 726/15 |
| 2011/0197070 A1* | 8/2011 | Mizrah | H04L 63/0869 713/176 |
| 2011/0213957 A1 | 9/2011 | Tsai et al. | |
| 2011/0219229 A1 | 9/2011 | Cholas et al. | |
| 2011/0277025 A1* | 11/2011 | Counterman | G06F 21/40 726/8 |
| 2011/0289314 A1* | 11/2011 | Whitcomb | G06F 21/33 713/155 |
| 2011/0307947 A1* | 12/2011 | Kariv | H04L 63/08 726/9 |
| 2012/0039469 A1 | 2/2012 | Mueller et al. | |
| 2012/0144464 A1 | 6/2012 | Fakhrai et al. | |
| 2012/0166998 A1 | 6/2012 | Cotterill et al. | |
| 2012/0179915 A1 | 7/2012 | Horn et al. | |
| 2012/0324234 A1 | 12/2012 | Hamid et al. | |
| 2013/0019278 A1 | 1/2013 | Sun et al. | |
| 2013/0019287 A1 | 1/2013 | Foley et al. | |
| 2013/0024371 A1 | 1/2013 | Hariramani et al. | |
| 2013/0042309 A1* | 2/2013 | Ozzie | G06F 21/35 726/5 |
| 2013/0047232 A1 | 2/2013 | Tuchman et al. | |
| 2013/0061055 A1 | 3/2013 | Schibuk | |
| 2013/0073672 A1 | 3/2013 | Ayed | |
| 2013/0106916 A1 | 5/2013 | Guo | |
| 2013/0170664 A1 | 7/2013 | Schwager | |
| 2013/0179954 A1* | 7/2013 | Bidare | H04L 63/18 726/7 |
| 2013/0185779 A1* | 7/2013 | Tamai | G06F 21/36 726/6 |
| 2013/0205133 A1* | 8/2013 | Hess | H04L 63/0884 713/155 |
| 2013/0219481 A1 | 8/2013 | Voltz | |
| 2013/0339165 A1 | 12/2013 | Calman | |
| 2013/0347089 A1* | 12/2013 | Bailey | H04L 9/3215 726/7 |
| 2014/0026124 A1 | 1/2014 | Gilbert et al. | |
| 2014/0033290 A1 | 1/2014 | Tuchman et al. | |
| 2014/0059672 A1 | 2/2014 | Natividad | |
| 2014/0075493 A1* | 3/2014 | Krishnan | G06F 21/31 726/1 |
| 2014/0108792 A1 | 4/2014 | Borzyski et al. | |
| 2014/0109174 A1* | 4/2014 | Barton | H04W 12/08 726/1 |
| 2014/0109175 A1* | 4/2014 | Barton | H04L 63/0807 726/1 |
| 2014/0115679 A1* | 4/2014 | Barton | G09C 5/00 726/7 |
| 2014/0165150 A1 | 6/2014 | Brunswig et al. | |
| 2014/0219453 A1 | 8/2014 | Neafsey et al. | |
| 2014/0223175 A1* | 8/2014 | Bhatnagar | G09C 5/00 713/159 |
| 2014/0281531 A1 | 9/2014 | Phegade et al. | |
| 2014/0289530 A1* | 9/2014 | De Waal | H04L 63/08 713/171 |
| 2014/0289841 A1 | 9/2014 | Hagiwara | |
| 2014/0337957 A1* | 11/2014 | Feekes | H04L 63/0853 726/9 |
| 2015/0089585 A1* | 3/2015 | Novack | H04L 63/08 726/3 |
| 2016/0005032 A1 | 1/2016 | Yau et al. | |
| 2016/0087957 A1* | 3/2016 | Shah | H04L 63/205 726/1 |
| 2016/0094991 A1 | 3/2016 | Powell et al. | |
| 2017/0221056 A1 | 8/2017 | Karpenko et al. | |

OTHER PUBLICATIONS

Fierrez-Aguilar et al., "Discriminative multimodal biometric authorization based on quality measures," 2004, pp. 777-779.

International Organization for Standardization/ International Electrotehcnical Commision, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted

(56) References Cited

OTHER PUBLICATIONS

Platform Module—Part 4: Commands," International Standard, ISO/IEC 11889-4:2009(E), 254 pages.
Microsoft, "authentication," Microsoft Computer Dictionary, 2002, p. 42.
Mostayed et al., "Foot Step Based Person Identification Using Histogram Similarity and Wavelet Decomposition," 2008, pp. 307-311.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Turajlic, "Neural Network Based Speaker Verification for Security Systems," 20th Telecommunications forum TELFOR 2012, Serbia, Belgrade, Nov. 20-22, 2012, pp. 740-743.
Varadharajan et al., "Techniques for assurance of claims," Dec. 2014, 52 pages.
Merriam-Webster, "economic," definition of economic, 2016, 1 page.

\* cited by examiner

TWO FACTOR AUTHENTICATION WITH AUTHENTICATION OBJECTS

CROSS-REFERENCE TO RELATED APPLICATIONS

This application is a continuation of U.S. patent application Ser. No. 14/316,691, filed Jun. 26, 2014, entitled "TWO FACTOR TOKEN BASED AUTHENTICATION OBJECTS," the disclosure of which is incorporated by reference herein in its entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

To enhance data security, numerous techniques have been developed. For example, the use of username and password combinations has become ubiquitous in various access control contexts. Additional techniques are also often used in addition to or instead of usernames and passwords. A common issue encountered with conventional authentication techniques is the tradeoff between security and usability. For example, passwords are often subject to stringent requirements to cause users to select passwords that are difficult to guess, either by automated processes or human operators. Such requirements may, for instance, require minimum numbers of capital letters, numbers and non-alphanumeric symbols. While such stringent requirements theoretically produce advantages for data security, they often have adverse effects. Stringent requirements, for instance, often make passwords difficult to remember, especially when requirements differ for different systems that each require a password for access. In many instances, users may engage in unsecure behavior to counteract the difficulties encountered in conventional access control systems. Users may, for example, write down or insecurely store passwords as a result of the difficulty of remembering them.

BRIEF DESCRIPTION OF THE DRAWINGS

Various embodiments in accordance with the present disclosure will be described with reference to the drawings, in which.

DETAILED DESCRIPTION

Figure 1:
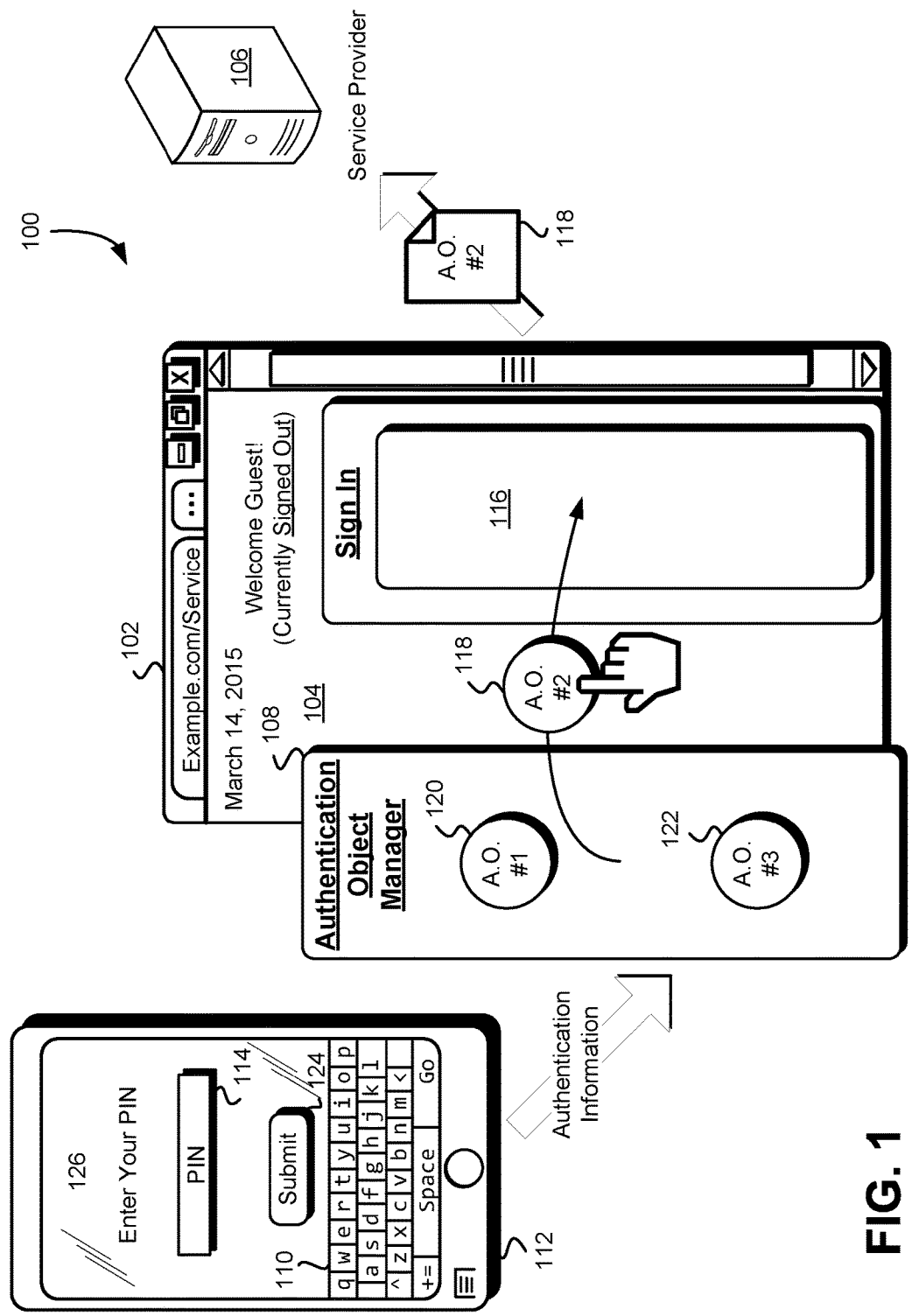
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein allow for increased data security while achieving a better user experience. In some embodiments, a graphical user interface allows for easy use of access credentials to gain access for which providing valid credentials is a prerequisite. For example, a user may utilize the graphical user interface to log in to a website to gain access to information and/or services of the website, although the techniques of the present disclosure are applicable in other contexts where credentials may be required for access (such as for access to functionality of a user interface usable to control home automation features). In some examples, the graphical user interface provides the user the ability to select a representation of an authentication object from a set of authentication objects and indicate that the selected authentication object is to be used for authentication. An authentication object, as described in more detail below, may be a collection of information forming an authentication claim that is necessary and/or sufficient for authentication to a system for which authentication is required for at least some access. As an illustrative example, an authentication object may be an encoding of a username and password combination and possibly other information necessary and/or sufficient for authentication. Other examples of information that may be included in an authentication object are described in more detail below. A representation of an authentication object may be a graphical element or collection of graphical elements of the graphical user interface that corresponds or collectively correspond to the authentication object. In other words, a representation of an authentication object may represent a set of actions for authenticating an identity. The actions, as discussed in more detail below, may include obtaining information for an authentication claim and/or submitting an authentication claim to a service provider. As an example, a representation of an authentication object may be an icon that visually indicates the authentication object.

The representation may, for example, be visually distinguishable from other representations on the graphical user interface. It should be noted that while visual representations on a graphical user interface are used throughout for the purpose of illustration, other representations that invoke human senses in addition to or alternatively to sight are also considered as being within the scope of the present disclosure.

As noted above, in various embodiments, a user is able to select a representation of an authentication object from the graphical user interface and indicate, through the same input or separate inputs, that the corresponding authentication object is to be used for authentication. As such, the user may use a representation of an authentication object to authenticate with a system without having to manually input some or all authentication information. As one example, the graphical user interface may be configured such that a drag and drop operation of the representation of the authentication object into a particular area of the graphical user interface can be used to select the representation and indicate that the authentication object is to be used for authentication. As another example, selection of the representation from a drop-down or pop-up menu of the graphical user interface may be used to select the representation and selection of a button corresponding to the menu may be used to indicate that the authentication object is to be used for authentication. Generally, numerous ways of selecting a representation of an authentication object and indicating that the authentication object is to be used for authentication are considered as being within the scope of the present disclosure. Further selection of the representation of the authentication object and indicating that the authentication object is to be used for authentication may be performed as a single operation where selection of the representation simultaneously serves to indicate that the authentication object is to be used for authentication.

Once an authentication object has been selected (e.g., by selection of the authentication object's representation in a graphical user interface), the authentication object may be provided to a system for which the authentication object is sufficient and/or necessary for authentication. In some embodiments, the selected authentication object is configured to be provided prior to selection of the authentication object. For example, the authentication object may be stored in memory of a computer system providing the graphical user interface and accessed from memory to be provided for authentication. In some embodiments, the authentication object is generated after a user indicates that the authentication object is to be used for authentication, such as by selecting a corresponding representation of the authentication object. To generate the authentication object (either before or after a user indicates that the authentication object is to be used for authentication, as appropriate for the particular embodiment being implemented), information may be obtained and the obtained information may be used to generate the authentication object.

In some embodiments, the authentication object is generated to be cryptographically verifiable by the system to which the authentication object is to be provided or another system that operates in conjunction with the system to which the authentication object is to be provided. For example, the authentication object may be encrypted so as to be decryptable by the system that will cryptographically verify the authentication object, where the ability to decrypt the authentication object serves as cryptographic verification of the authentication object. As another example, the authentication object may be digitally signed (thereby producing a digital signature of the authentication object) such that the digital signature is verifiable by the system that will cryptographically verify the authentication object. In other examples, both encryption and digital signatures are used for cryptographic verifiability (and security). The key used to encrypt and/or digitally sign the authentication object may vary in accordance with various embodiments and the same key is not necessarily used for both encryption and digital signing, where applicable. In some embodiments, a key used to encrypt an authentication object is a public key of a public/private key pair where the private key of the key pair is maintained securely by the system to which the authentication object is to be provided, thereby enabling the system to decrypt the authentication object using the private key of the key pair. Using the public key to encrypt the authentication object may include generating a symmetric key, using the symmetric key to encrypt the authentication object, and encrypting the symmetric key using the public key, where the encrypted symmetric key is provided to a system with the encrypted authentication object to enable the system to use the corresponding private key to decrypt the symmetric key and use the decrypted symmetric key to decrypt the authentication object. Further, in some embodiments, the authentication object is digitally signed using a private key of a public/private key pair corresponding to the computer system that encrypts and/or digitally signs the authentication object (e.g., the user's computing device). For example, an application that manages authentication objects may be provisioned with the private key and the authentication object may include a certificate for the private key for use by a system for verification of the digital signature of the authentication object. Other variations, including variations where a symmetric key shared between the user's computer system and the system that cryptographically verifies the authentication object is used to encrypt and/or digitally sign the authentication object.

As noted, various types of information may be obtained to generate the authentication object. Such information may include authentication credentials, such as a username and password and/or information derived therefrom (e.g., a hash of a username and/or password) and/or other credential information. In some embodiments, the information obtained includes an attestation to the state of a computing environment in which the authentication object is selected. For example, the attestation may indicate that an authentication object manager application is unaltered, that a computer system on which the application object manager executes has a particular anti-virus software application installed, that the anti-virus software application has received a recent update, that an operating system of the computer system has had a particular update applied, or otherwise that the computer system of the authentication object manager is in a state in which the computer system is required to be in for the authentication object to be successfully used.

Further, in some embodiments, the information obtained includes an attestation to one or more sensor measurements that have been made by one or more sensors of the device on which the authentication manager application is executed. For example, the attestation may indicate that an accelerometer has measured at least a threshold amount of movement over a time period. As another example, an attestation may indicate that a global positioning service (GPS) sensor has been used to determine a particular location of a device, such as through the use of in the attestation. Attestations to data collected using one or more other sensors including, but not limited to, microphones and cameras are also considered as being within the scope of the present disclosure.

In some embodiments, authentication objects are used to distinguish human users (human operators) from automated agents (often referred to as bots), such as automated agents that, in an automated fashion, transmit and receive information to navigate a website for various purposes, such as the collection of information from the website. For example, an authentication object may encode a solution to a test (puzzle) configured to be easier for human users to solve than for automated agents. The test may be, for example, a completely automated public Turing test to tell computers and humans apart (CAPTCHA) test. In some embodiments, a user is able to interact with a user interface to input a solution to a test and perform a drag and drop operation of a proposed solution to the test to submit the proposed solution. The proposed solution may be encoded in an authentication object with additional information, such as described above. In this manner, systems relying on such tests may utilize the enhanced usability provided by authentication objects while still being able to mitigate the effects of automated agents.

In some embodiments, the authentication object manager may be executed by a second device and may enable a first device to access one or more restricted computing resources using an authentication object of the authentication object manager executed by the second device. For example, the user may attempt to access restricted resources of the service provider on the user's desktop computer, the service provider may require additional authentication in order to enable the user access to the restricted resources through the desktop computer. A prompt may then be displayed on the second device executing the authentication object manager, such as the user's mobile phone, the prompt may enable the user to select the appropriate authentication object to enable the user's desktop computer access to the restricted resources of the service provider. The second device may provide the authentication object directly to the first device requiring additional authentication or the second device may provide the authentication object directly to the service provider requesting the additional authentication. The first device may use all or part of the authentication object in order to gain access to the one or more restricted resources. For example, the authentication object received from the second device may include a hash of a password and GPS coordinates, the first device may simply provide the service provider with the GPS coordinates in order to gain access to the requested resources.

The second device may capture and/or obtain information using one or more sensors as described above. An attestation of the sensor information obtained by the second device may be included in the authentication object. Furthermore, the second device may perform additional processing of the sensor information, such as face recognition, pattern recognition, geo-fencing or other processing of the sensor data suitable for providing information usable in authentication. Once the second device has obtain the sensor information, the second device may process the data in order to determine if the sensor information is valid. For example, the second device may check the GPS coordinates in order to determine if the second device is in the required location. Additionally a trusted platform module (TPM) or other cryptographic module included in the second device may generate an attestation to the sensor information obtained by the second device. For example, the second device may include a mobile phone with a plurality of cameras, the cameras may capture the user's hand and other information about the environment as the user performs a drag and drop operation on the second device. The attestation of the information collected by the cameras may be included in the authentication object and provided to the first device in order to enable the first device access to restricted resources based at least in part on the authentication object. Furthermore, the attestation of the sensor information may include information corresponding to the type of sensor responsible for capturing the sensor information. For example, the attestation may include the type of fingerprint reader included in the second device and used to collect biometric information from the user of the second device. In various embodiments, the sensor information may be included in the authentication object with or without attestation. The authentication object may also include the attestation without including the sensor information collected by the second device corresponding to the attestation. The authentication requirements of the authentication object manager or the system requiring two factor authentication may be modified based at least in part on the type of sensors used.

The authentication manager may include information in the authentication object based at least in part on a device that is not executing the authentication manager. For example, the second device including the plurality of cameras may capture a one-time password (OTP) obtained from a one-time password token and the captured OTP may be included in the authentication object. The two factor authentication process may be invoked or caused to be invoked by the authentication object manager but the authentication object may be authenticated by a different system, such as the system receiving the authentication claim or a system designated by the system receiving the authentication claim. For example, an authentication object may be authenticated by an identity provider designated by the service provider.

FIG. 1 shows a diagram 100 illustrating various aspects of the present disclosure. In the illustrated embodiment, the diagram 100 shows a graphical user interface generated by an application which, in this example, is an interface of a browser application 102, although other types of applications may provide a graphical user interface. The browser application may be executed on a computing device such as a personal computer, notebook computer, tablet computer, mobile phone or other device. Executable code for generating the graphical user interface may be application code stored locally on a device executing the application or, as typical with browser applications, the code may be generated remotely and transmitted to the device executing the application to be executed with the code of the browser application. It should be noted however that various aspects of the present disclosure are applicable to other types of interfaces and are not limited to those provided through browser applications. For example, techniques of the present disclosure may be utilized in connection with mobile applications on a mobile device that utilizes network communications. In the illustrative example of FIG. 1, the browser application displays a web page 104 provided by a service provider 106. The service provider 106 may for example operate a collection of computing devices, including one or more web servers, to provide the web page 104 to various users. The service provider 106 may transmit the web page 104 in the form of one or more hypertext markup language (HTML) documents or other documents or collection of documents that are processed by the browser application 102 to display the web page 104 on a display device of a computer system on which the browser application 102 is executed.

The service provider 106 may require a user to log in or otherwise authenticate an identity of the user in order to access certain resources of the service provider. The web page 104 may contain a sign in screen or area 116 of the web page 104 usable for authentication. Additionally, the service provider may require authentication information from another device before allowing access to the computing device executing the browser application 102. In various embodiments, a mobile device 112 is used to provide authentication information useable for accessing one or more resources of the service provider 106. The authentication object manager 108 may transmit a request to the mobile device 112 for the authentication information. The authentication object manager 108 may be configured such that access to representations 118, 120, 122 of corresponding authentication objects is restricted until the authentication information is received from the mobile device 112. Accordingly, as illustrated in FIG. 1, one state of the display of the mobile device 112 may include an authentication screen 126. The authentication screen 126 may, for example, include a personal identification number (PIN) field 114 and a submit button 124 to enable a user to submit credentials input into the PIN field 114 using a keyboard 110 of the mobile device 112.

The authentication information may be any information obtained by the mobile device either by user input or one or more sensors and/or other components of the mobile device 112. For example, the authentication information may be a hash of the PIN entered by the user in the PIN field 114. The hash of the PIN may then be verified by the authentication object manager 108 before access to representations 118, 120, 122 of corresponding authentication objects is enabled. In various embodiments, the mobile device 112 may execute a second authentication object manager and may provide authentication information by at least receiving the user's selection of a representation corresponding to an authentication object. The mobile device 112 may also obtain information corresponding to a state of the computing environment which the mobile device 112 is in. For example, the mobile device 112 may collect information about one or more local area network and/or device attached to the one or more local area networks. The mobile device 112 may also capture information corresponding to the state of the computing environment using one or more sensors included in the mobile device 112. For example, the mobile device 112 may capture one or more images using cameras included in the mobile device 112. In another example, the mobile device 112 may record a user finger-print using a finger-print scanner included in the mobile device 112. The authentication information provided by the mobile device 112 may be verified by the authentication object manager 108, another component of the mobile device 112, the service provider and/or component thereof, or any combination thereof. Once the authentication information is successfully verified, the authentication object manager 108 may then enable access to representations 118, 120, 122 of corresponding authentication objects on the computing device executing the browser application 102.

As illustrated in FIG. 1, an authentication object manager 108 is displayed with the browser application 102 (i.e., a display corresponding to execution of the authentication object manager 108 is shown with a display corresponding to execution of the browser application 102). The authentication object manager 108, as discussed in more detail below, may be implemented in various ways in accordance with various embodiments. For example, the authentication object manager 108 may be an application, separate from the browser application 102, executing on the computer system that executes the browser application 102. In some examples, the authentication object manager 108 is a plugin application of the browser application 102 and configured to operate in conjunction with the browser application 102, such as described in more detail below. As illustrated in FIG. 1, in an embodiment, the authentication object manager 108 provides access to a set of authentication objects. To provide access to a set of authentication objects, as illustrated in FIG. 1, the authentication object manager, for one or more authentication objects, provides for display of a representation of an authentication object to which access is provided. As illustrated in FIG. 1, for example, the authentication object manager 108 provides for display representations 118, 120, 122 of corresponding authentication objects.

In some embodiments, the authentication information from the mobile device 112 is transmitted directly to the service provider 106 and is separate from the authentication object 118. The computer system executing the browser application 102 may also submit the authentication object separate from the authentication information and the service provider 106 may verify information contained in the authentication object corresponding to the representation 118 and the authentication information provided by the mobile device 112. If verification by the service provider 106 is successful, the service provider may provide access for which presentation of the authentication object corresponding to the representation 118 is sufficient and/or enable an operation to be executed by the computing device executing the browser application 102. Additionally, the mobile device 112 may provide the authentication information to the service provider 106 and the service provider may transmit a push notification to the computing device executing the browser application 102 indicating a result of verifying the authentication information from the mobile device 112.

An authentication object, in an embodiment, is a collection of information sufficient and/or necessary for access to one or more service provider systems. The information for example may comprise credentials usable for access to a service provider system. In one example, an authentication object encodes a username and a password where the username and password are sufficient for access to the service provider system. In this example the username and password may be credentials of a user on behalf of whom the authentication object is presented, such as described in more detail below. In other embodiments an authentication object may encode credentials not of the user, but of the authentication object manager, where one or more processes have been performed to enable the service provider system to associate credentials of the authentication object manager 108 with credentials of a user, thereby enabling the authentication object manager 108 to authenticate on behalf of the user. In this manner, an authentication object presented to the service provider 106 may encode one or more credentials of the authentication object manager and, by virtue of those credentials being valid, the service provider may allow the user to obtain access to information provided by the service provider 106.

In some embodiments, each authentication object 118, 120, 122 is usable for authentication with a different service provider. To authenticate with a particular service provider, a user may select a representation of an authentication object corresponding to that service provider. Multiple different authentication objects may be used with the same service provider, in some embodiments. In some examples, different authentication objects are usable for different types of access to a system of a service provider. A first authentication object may, for instance, be usable for general authentication. A second authentication object may be usable to complete a commercial transaction (e.g., purchase of one or more items offered for consumption in an electronic marketplace). A third authentication object may be usable to change a password and/or other account settings. Other examples are also considered as being within the scope of the present disclosure.

Further, in some embodiments, authentication objects associated with one service provider may be usable with other service providers. For instance, an authentication object associated with a social networking service may be usable with a provider of an electronic marketplace to enable a user to link a marketplace account with a social network account without being burdened with having to enter credentials for both providers at the time the user directs the link to be established. As yet another example of variations considered as being within the scope of the present disclosure, an authentication object manager may be configured with programming logic to detect what authentication objects are usable with a particular service provider, select those authentication objects from a set of authentication objects that includes one or more authentication objects unusable with the service provider, and provide representations of the selected authentication objects (excluding the unusable authentication objects) to make user identification of a suitable authentication object easier.

Other variations include embodiments where authentication objects are aggregated into a single object, such as by aggregating the information contained in the individual authentication objects and/or by wrapping individual authentication objects in another authentication object. Such embodiments may be used, for example, instances where credentials for multiple providers are needed, such as the example above regarding linking accounts of different providers.

As illustrated in FIG. 1, in various embodiments, the authentication object manager allows for user selection of a representation of an authentication object and for indication of the selected authentication object to be used for authentication. In the particular illustrative example of FIG. 1, a user has selected a representation 118 of an authentication object thereby selecting the corresponding authentication object. In this example, the user may indicate that the selected authentication object corresponding to the selected representation 118 is to be used for authentication by performing a drag and drop operation from an area of the display of the authentication object manager 108 to an area 116 of the web page 104 usable for authentication. The drag and drop operation may be performed, for example, by placing a cursor on the representation 118 holding a mouse button, such as a left mouse button should a mouse device have two buttons, and moving the mouse so that the representation 118 moves on the display from the authentication object manager 108 to the area 116 for authentication, and releasing the button when the representation 118 is at least mostly within the area 116. It should be noted, however, that the particular method by which authentication objects are selected and indicated for use in authentication may vary in accordance with various embodiments and in accordance with the various types of interfaces used. For example, in some embodiments interaction with a touch screen may cause a representation of an authentication object to be moved from the authentication object manager 108 to the area 116 for authentication. As another example, the authentication manager may provide representations in the form of a drop down list, popup menu or other graphical user interface element that enables selection of the representation. Generally, any way by which a representation of an authentication object may be selected and indicated for use in authentication may be used and the scope of the present disclosure is not limited to those particular embodiments illustrated in the figures and described in connection therewith.

Turning back to the illustrative example shown in FIG. 1, the drag and drop operation of the representation 118 of the authentication object to the area 116 for authentication causes the browser application 102 to send the corresponding authentication object to the service provider 106. The service provider, as discussed in more detail below, may verify information contained in the authentication object corresponding to the representation 118 and provide access for which presentation of the authentication object corresponding to the representation 118 is sufficient.

As with all specific embodiments illustrated and discussed herein, variations are considered as being within the scope of the present disclosure. For example, the figures extensively provide examples where representations of authentication objects are graphical representations. Representations may be provided in other forms in accordance with various embodiments. For example, a user interface may provide an audio representation of an authentication object where the audio representation may comprise one or more sounds usable to identify a corresponding authentication object. As another example, a tactile interface may provide a tactile representation of an authentication object where tactile features of the representation are usable to distinguish the authentication object from other tactile representations of other authentication objects. Generally, any way by which an interface may utilize one or more senses of a user to distinguish representations of authentication objects from each other may be used. Generally, a representation of an authentication object may invoke one or more senses of the user. Other variations are also considered as being within the scope of the present disclosure.

Figure 2:
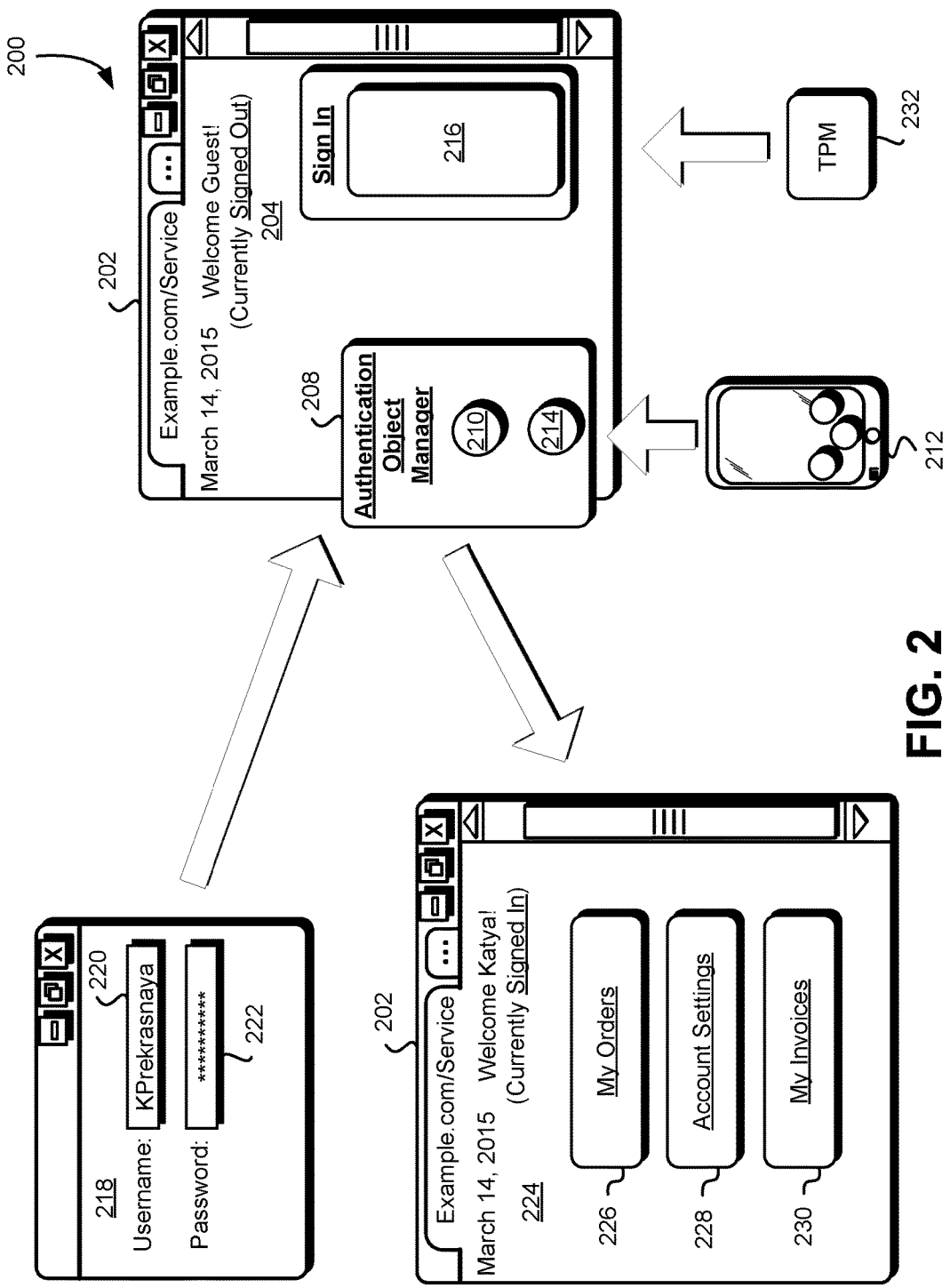
FIG. 2 shows another diagram illustrating various aspects of the present disclosure.

In various embodiments of the present disclosure, access to the functions of an authentication object manager is subject to restrictions. For example, in some embodiments, an authentication object manager is configured to not provide access to authentication objects unless valid credentials have been presented to the authentication object manager or until a user has otherwise provided proof to the authentication object manager that the user has the requisite credentials and/or otherwise satisfies one or more requirements programmed into the authentication object manager. FIG. 2, accordingly, shows an illustrative example of a diagram 200 illustrating various aspects of the present disclosure whereby access to an authentication object manager is restricted. In the diagram 200, a browser application 202 is presented, which may be the same browser application as discussed above in connection in FIG. 1. Further, as with all techniques described herein, the techniques while described in connection with a browser application are applicable to other applications. In the example of FIG. 2, the browser application 202 displays a web page 204 on which an authentication object manager 208 is superimposed, such as described above. The authentication object manager may provide access to authentication objects through representations 210 and 214 of the authentication objects. As described above in connection with FIG. 1, a representation of an authentication object may be selected and indicated for use in authentication through a drag and drop operation from the authentication object manager 208 to an area 216 of the display for authentication.

In various embodiments, as noted, access to authentication objects managed by the authentication object manager 208 requires the presentation of credentials such as a username and password for the authentication object manager 208. FIG. 2, accordingly, shows an illustrative example of an interface 218 that allows for the input of credentials for providing access to functionality of the authentication object manager 208. The example interface 218 may appear in various ways in accordance with various embodiments. In some embodiments, for example, the interface 218 may appear instead of the authentication object manager 208 in the display of the browser application 202. As another example, the interface 218 may be part of a login screen to the authentication object manager presented separately from the browser 202. In yet another example, the interface 218 may be part of a login screen of an operating system where successful authentication (i.e., presentation of valid credentials) is a requirement for access not only to the authentication object manager, but to other applications. The interface 218 may be a component of a browser plug-in application or an application separate from the browser. In another example, the interface 218 may be provided by a website provided remotely from the device on which the interface 218 is displayed. The website may be, for example, a component of a system that manages authentication objects remotely for users as a service. Other variations are also considered as being within the scope of the present disclosure.

In this example illustrated in FIG. 2, as noted, the interface 218 is configured to enable the input of credentials sufficient for access to functionality of the authentication object manager 208. In this example, the interface 218 includes a username field 220 and a password field 222 which, in this example, are graphical user interface elements that enable a user to enter (e.g., via a virtual or physical keyboard) alphanumeric input corresponding to respectively a username and password. As with all embodiments described herein, variations that utilize different credentials or additional credentials are also considered as being within the scope of the present disclosure. The interface 218 may be displayed on a mobile device 212 or other device separate from the computing device executing the browser application 202. The mobile device 212 may provide additional authentication information to the authentication object manager 208 or other entity. For example, the mobile device 212 may provide credential information in a two factor authentication operation.

In an embodiment, the authentication object manager 208 is configured to provide access to authentication objects represented by the representations of the authentication objects 210 and 214 only after valid credentials have been input using the interface 218. Thus, once the interface 218 has been used by the user to provide valid credentials, the user may utilize the authentication object manager 208 to select a representation of an authentication object and indicate that the selected representation should be used for authentication. In this particular example, the authentication object manager 208 is configured to provide the user an ability to select a representation of an authentication object usable to access functionality of a website of which the web page 204 is a part. Accordingly, having selected a representation of an authentication object corresponding to valid credentials for the website, a system providing the website may enable access to another web page 224 of the website through which the functionality is accessible. For instance, the web page 224 illustrated in FIG. 2 includes user interface elements (buttons, in this example) which are selectable to obtain account specific information that would otherwise not be accessible had valid credentials not been provided either through the authentication object manager 208 or otherwise such as through manual entry of a username and password in appropriate fields for the website.

Information provided to the system that provides the website may also include additional information, much of which is described below with more detail. For example, the authentication object manager 208 may utilize information from a trusted platform module 232 of the computing device on which the browser application 202 executes or the mobile device 221. The trusted platform module 232 may, for example, provide an attestation to the state of the computing environment in which the browser application 202 executes or the state of the computing environment associated with the mobile device 212. Other information, such as additional credential information, may be utilized by the authentication object manager 208. In some embodiments, proof of possession by the user of an item for which possession by the user is necessary according to at least one mode of authentication with the service provider. Such proof, for instance, may comprise a one-time password (OTP) obtained from a one-time password token, which may be a separate device from the computer device on which the browser application 202 executes or which may be integrated into the computing device. Other information, such as a personal identification number (PIN), other personal identifying information (e.g., demographic information), and, generally, additional information input by a user or otherwise obtained to increase security and prevent unauthorized use of an authentication object manager to authenticate using authentication objects may be used.

Figure 3:
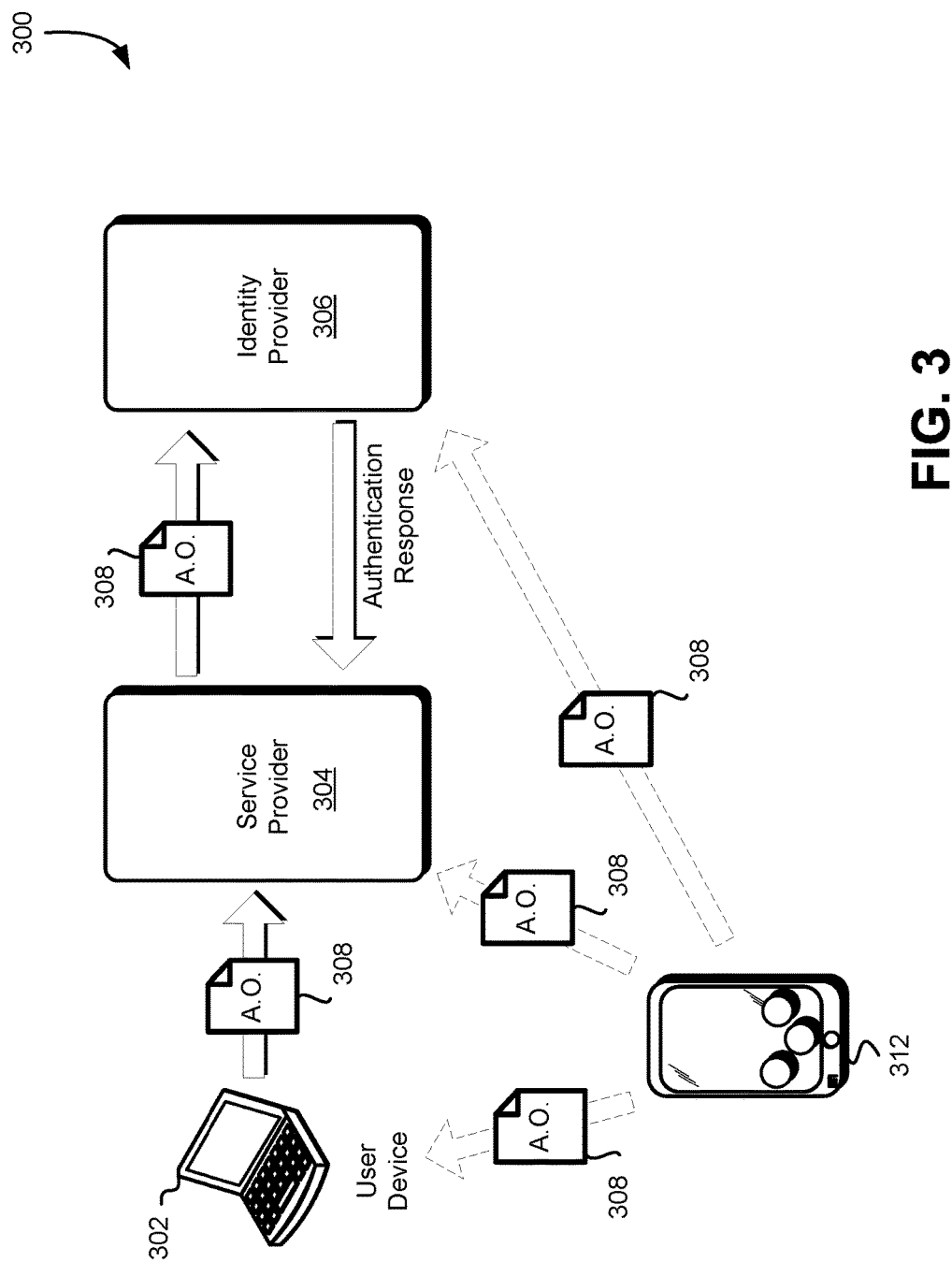
FIG. 3 shows an illustrative example of an environment in which various embodiments may be practiced.

In various examples described herein, users are described as providing authentication objects to service providers for verification thereby. However, numerous variations are considered as being within the scope of the present disclosure. FIG. 3, for example, shows an illustrative example of an environment 300 in which an authentication object is verified not by the service provider for which access is desired by a user, but by another entity. That is, a computer system managed by another entity. In an embodiment, the environment 300 includes a user device 302, a service provider 304 and an identity provider 306. The user device 302 is illustrated in FIG. 3 as a notebook computer, although the user device may be any device such as described elsewhere herein. The service provider 304 may comprise a collection of computing devices, collectively configured to provide a service to one or more users through corresponding devices used by the users. The service provider 304 may, for instance, provide a website or a backend system supporting a mobile or other application executing on the user device. The identity provider 306 may be a computer system comprising a collection of computing devices collectively configured to manage authentication for a set of service providers including the service provider 304. The identity provider 306 may, for example, be an entity that operates its own services such as social networking services, an electronic commerce website, its own other type of website and/or other services.

In an embodiment as illustrated in FIG. 3, the user device 302 provides an authentication object 308 to the service provider 304 for the purpose of authenticating with the service provider 304 and gaining access to services for which authentication is required. The authentication object 308 may be provided, for example, as a result of user input provided to the user device 302 by a user of the user device 302. In another example, the authentication object 308 may be provided by a mobile device 312. Alternatively, the mobile device 312 may provide the authentication object 308 directly to the service provider 304. In various embodiments, the service provider 304 detects an attempted access, by the user device 302, services for which authentication is required, the service provider 304 may then request, from the mobile device 312, the authentication object 308 for the purpose of authenticating the user device 302 with the service provider 304. The user may, for example, utilize a graphical user interface or other interface such as described above to select the authentication object. Instead of verifying the authentication object 308 itself, the service provider 304 may transmit the authentication object 308 or information derived therefrom to the identity provider 306. The identity provider 306 may process the authentication object 308, such as by cryptographically verifying the authentication object 308 and determining whether credentials and/or other information provided in the authentication object 308 are valid or otherwise satisfy one or more conditions for authentication.

The identity provider 306 may make an authentication decision determined based at least in part on the authentication object 308 and generate an authentication response which, in an embodiment, is a communication or collection of communications that indicate whether authentication was successful (e.g., whether the information contained within the authentication object was sufficient for authentication). The generated authentication response may then be provided from the identity provider 306 to the service provider 304. If the authentication response from the identity provider 306 indicates that authentication was successful, the service provider 304 may allow the user device 302 to access services (e.g., website functionality) for which authentication was required.

Similarly, if the authentication response indicates that authentication was not successful, or if the service provider 304 does not receive an authentication response, the service provider 304 may continue to restrict access to services for which authentication is required, although access to other services such as browsing portions of a website may remain to be permitted.

In this manner, a user of the user device 302 is able to utilize authentication objects despite a service provider 304 not being able to process the particular authentication objects being used. Similarly, the service provider 304 may utilize the services of another provider to manage authentication to avoid having to manage authentication itself, or to expand the number of users that are able to access the service provider's site by enabling users to utilize authentication services of another provider.

As with all embodiments described herein, variations are considered as being within the scope of the present disclosure. For example, in FIG. 3 a flow of information is illustrated, where an authentication object is transmitted to the service provider 304 from the user device 302, and where the service provider 304 passes the authentication object 308 to the identity provider 306 for verification. Variations include embodiments where the user device 302 provides the authentication object 308 directly to the identity provider 306, instead of through the service provider 304. For example, a portion of a web-page provided by the service provider 304 may be configured such that a request to authenticate is transmitted by the user device 302 to a network address of the identity provider 306, instead of a network address of the service provider 304. A portion of the web-page may, for example, use framing techniques to frame a portion of content linked to the network address of the identity provider 306.

The identity provider 306 may, upon successful verification of the authentication object, provide cryptographically verifiable proof of successful authentication to the user device for use in proving successful authentication with the service provider 304. For example, the proof may be encrypted using a public key of a public/private key pair for which the service provider 304 has access to the private key. As another example, the proof may be digitally signed by the identity provider 306 using a private key of the identity provider such that the service provider 304 can verify the digital signature using a corresponding public key. The user device 302 may provide the proof of authentication received from the identity provider 306 to the service provider 304 in connection with requests submitted to the service provider 304. The service provider 304 can cryptographically verify the proof and determine whether to provide access.

Figure 4:
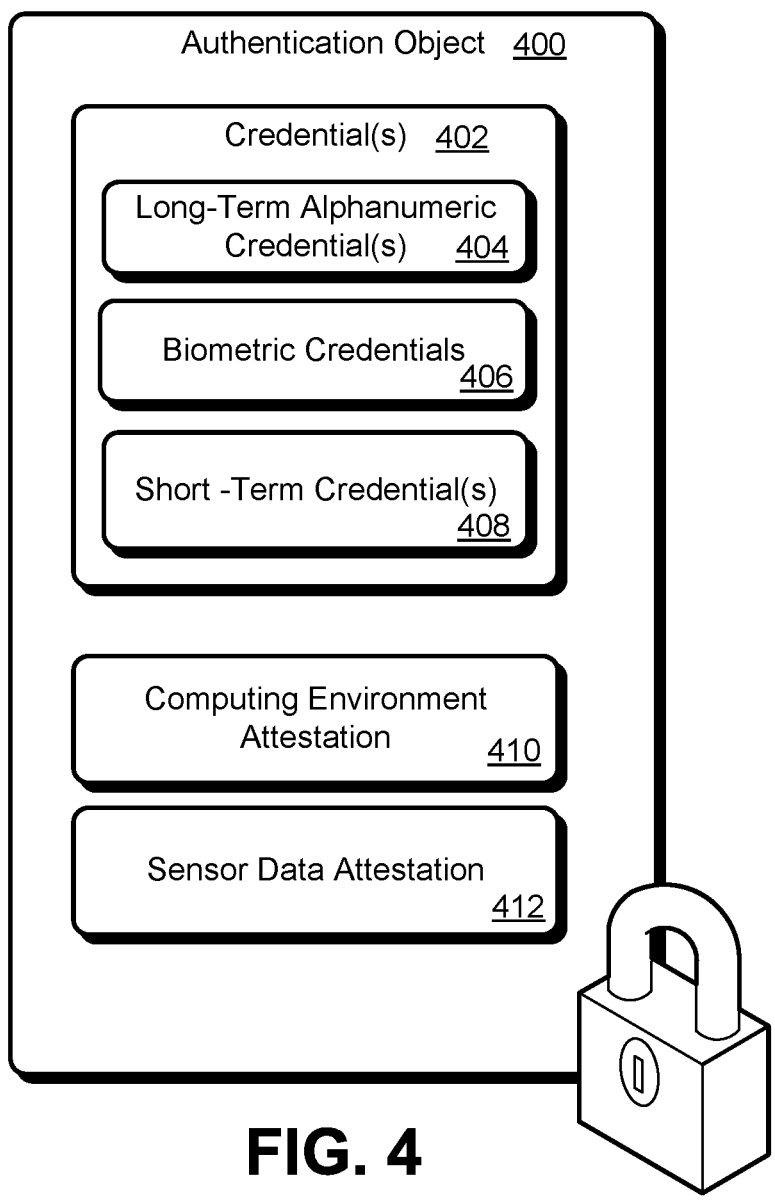
FIG. 4 shows a diagram illustrating a configuration of an example authentication object in accordance with at least one embodiment.

As noted, authentication objects may be configured in various ways in accordance with various embodiments. FIG. 4, accordingly, shows an illustrative example of an authentication object and information that may be contained therein in accordance with various embodiments. An authentication object, in an embodiment, is a structured collection of information forming an authentication claim sufficient for authentication to one or more systems to which the authentication object corresponds. The authentication object may include authentication information in a structured format utilizing, for example, a structured markup language, such as extensible markup language (XML), JavaScript object notation (JSON), although other encodings of authentication objects are considered as being within the scope of the present disclosure. Generally, any way by which information may be encoded, in a structured or unstructured manner, may be used and the manner by which information and authentication objects are encoded may vary in accordance with the various systems to which the authentication objects are submitted for authentication. One system, for example, may require and/or treat as sufficient a first format, where a second system may require and/or treat as sufficient a different format with different information. Some systems may be configured with the ability to process unstructured information by determining if an authentication object contains information sufficient for authentication.

In the embodiment illustrated in FIG. 4, an authentication object 400 includes one or more credentials sufficient for accessing a system to which the authentication object corresponds. It should be noted that a single authentication object may be usable for authentication with multiple different systems which may be managed and operated by different entities. In some examples, credentials 402 contained within an authentication object 400 include long term alphanumeric credentials 404 corresponding to an identity. Long term alphanumeric credentials may comprise, for example, one or more of a username, password, electronic mail address, PIN, telephone number, physical mailing address, network address, or other identifier or collection of identifiers that collectively uniquely map to an account of a system for which the authentication object 400 is submittable. In some embodiments, instead of a long-term credential being included directly in the authentication object 400, the authentication object 400 includes information generated based at least in part on one or more long term credentials, such as one or more hash values of one or more long term credentials. Thus, regardless of whether the authentication object includes a long term credential or information derived therefrom, the authentication object, in this example, has information based at least in part on the long term credential. Long term credentials and information derived therefrom may, in some embodiments, may be included in the same authentication object. For example, an authentication object may include a username and a hash of a password. Credentials 402 of an authentication object 400 may also include biometric credentials 406. Example biometric credentials include, but are not limited to, instances of information encoding one or more fingerprints, one or more retinal scans, deoxyribonucleic acid (DNA), a human voice, an image of a face, typing cadence and others. Biometric credentials 406 generally may comprise information suitable for use in a biometric authentication system. The information may, for example, be an optical and/or capacitance scan of one or more fingerprints or information obtained by processing a scan of one or more fingerprints. Similarly, an image of a face or information obtained from processing an image of a face may be used. Generally, the type of biometric information and the manner in which it is included in the authentication object may depend from the capabilities of the system to which the authentication object is submittable.

In an embodiment an authentication object 400 includes one or more short-term credentials 408. A short-term credential may be a credential that, due to a limited lifetime, is required to be presented to an authentication object manager within a limited amount of time before generation of the authentication object 400. Upon selection of a representation of the authentication object 400, for example, an authentication object manager may obtain the one or more short-term credentials 408 for inclusion in the authentication object 400. As discussed above, example short-term credentials include an OTP code obtained from an OTP token such as described above. Example OTP tokens include token devices produced by the EMC Corporation (e.g., RSA SecurID tokens) and tokens produced by Gemalto NV. OTP tokens may also be integrated into a device that provides authentication objects, such as a user computing device and information may be obtained therefrom accordingly. Another example of a short-term credential is a cryptographically verifiable time stamp from a time server. Generally, a short-term credential may be any credential valid for an amount of time determined as short and, as a result, the use of short term credentials adds an additional layer of security in that the amount of time a compromised short-term credential is valid is limited, thereby preventing security breaches and/or the effects of security breaches.

In various embodiments, an authentication object 400 includes one or more attestations. The one or more attestations may be attestations to various facts which are required to be true for authentication using the authentication object 400 to be successful. As an example, an authentication object 400 may include a computing environment attestation 410 attesting to the integrity of the computing environment and/or the integrity of one or more components of the computing environment. An attestation to a computing environment may include information encoding the state of one or more components associated with an authentication object manager that manages the authentication object 400. For example, the computing environment attestation 410 may indicate that the computing device on which the authentication object manager operates has a particular serial number or other identifier, is connected to a particular network, that the computing device has particular anti-virus software running, that the anti-virus software has been updated within some time defined as recent and/or has received an update with a specified identifier, that an operating system on which the authentication object manager operates has received a particular software patch, that executable code of the authentication object manager or other executable code has been unmodified (or, generally, that the executable code is in an approved state), that the device on which the authentication object manager operates has one or more required security features (e.g., remote wipe) enabled and/or other information about the computing environment in which the authentication object manager operates. In some examples, the computing environment attestation 410 in an authentication object 400 includes information about other devices different from the device that presented and/or generated the authentication object 400. For instance, in some embodiments, multi-factor authentication requires cryptographically verifiable information from two or more separate authentication object managers, each operating on a different device (e.g., a user's personal computer and the user's mobile device where both have been registered to the owner in a system that verifies authentication objects). Accordingly, the computing environment attestation may include cryptographically verifiable information from multiple authentication object managers to enable authentication determinations.

As illustrated in FIG. 4, an authentication object 400 may also include sensor data attestation 412. Sensor data attestation may be an attestation to measurements made by one or more sensors of a computing device on which the authentication object manager is operating or generally any device which may be a different device for which the authentication object manager can verify sensor measurements. As an illustrative example, to be sufficient for authentication, an authentication object 400 may be required to contain an attestation that an accelerometer of a computing device measured a certain amount of activity within a specified time period, such as the previous six hours measured from a point of time in a process involved for generation of the authentication object 400 or since a particular time reference (e.g., 7:00 AM PST). Such an attestation may be useful, for example, as discussed in more detail below for children to prove, using authentication objects, to parents or other authorities that they have engaged in a particular amount of physical activity prior to engaging in another activity considered sedentary, such as watching television, playing electronic games or otherwise interacting with a system (e.g., set top box, media player and/or gaming console) that may utilize authentication objects as an access control mechanism.

Other data included in the sensor data attestation may be an attestation that a computing device is within a certain geo-fenced area as determined by a global positioning service sensor of the computing device. As an example, a system that processes an authentication object may verify attested global positioning service (GPS) data to verify that the authentication object was submitted from a device that is within specified distance of a reference location, which may be a static reference location or which may be determined by, for instance, a GPS sensor of another device. The location may, of course, be determined in other manners. For example, the computing device may receive coarse-grained location data using a location service. Both Wi-Fi hotspots and cell towers can be used to approximate a location of the computing device. When the location service is polled, the IDs of the Wi-Fi hotspots and cell towers in the area are sent to the location service, which includes a database storing location information on Wi-Fi hotspots and cell towers. The location service returns an approximate location (e.g., latitude and longitude) of the computing device based on the MAC address of the Wi-Fi hotspot. It should be noted that the accuracy of the location data may be between 100 m-500 m using Wi-Fi hotspots and greater than 500 m using cell towers. In contrast, the accuracy of GPS location data may be between 2 m-20 m. Generally, any sensor included in the device may be used and sensor data attestation 412 may include information based, at least in part, on measurements from any of the sensors. The computing environment attestation 410 and sensor data attestation 412 may be obtained from a second computing device such as a mobile device described below in connection with FIG. 8 and various other embodiments in accordance with the present disclosure. For example, the computing environment attestation 410 and sensor data attestation 412 may be included in authentication information transmitted from a user mobile device to the computing device responsible for generating the authentication object 400, as described above in connection with FIG. 1.

The manner in which attestations are provided in an authentication object may vary in accordance with various embodiments. For example, in some embodiments, attestations comprise expressions indicting that particular conditions are true, such as that a sensor has measured a certain amount of activity or that a GPS data indicates a location within an area defined as suitable. Attestations with such expressions may lack the actual measurements. In other embodiments, an attestation may include data that is measured for the attestation which is then processed by a system that processes the authentication object. In this manner, the attestation is an attestation that data is accurate and whether the data satisfies conditions required for authentication or otherwise is determined by another system to which the authentication object 400 is submitted. Computing environment attestations may be used in connection with sensor attestations to enable verification that, for instance, executable code of an application (e.g., authentication object manager or other application) correctly and accurately calculates that the conditions are true and/or correctly and accurately provides sensor data. In other words, computing environment attestations may be used to prove that executable code that causes a computer system to provide sensor data, provide conclusions determined based at least in part on sensor data and/or provide other information is unmodified and, therefore, can be trusted.

It should be noted that the authentication object 400 may include some (but not all) or all types of data illustrated in FIG. 4. In addition, an authentication object may include additional data not discussed here in and/or not illustrated in FIG. 4. Generally, the types of data included in an authentication object may vary widely in accordance with various embodiments and with the various systems that may utilize authentication objects for authentication. Further, while FIG. 4 and the accompanying description use various types of information included in an authentication object for the purpose of illustration, in various embodiments, an authentication object may lack some or all of the example information but rather contain a verifiable (e.g., cryptographically verifiable) attestation that various conditions regarding an identity and/or a computing environment are satisfied. Such an attestation may, for example, include a digital signature of executable code of one or more applications configured to verify the conditions. Other variations are also considered as being within the scope of the present disclosure. The applications may be executed on a device of the user on behalf of which the authentication object is presented or another device.

In some embodiments, authentication objects may encode one or more policies. A policy encoded in an authentication object may specify one or more limitations on use of the authentication object and/or one or more permitted uses of the authentication object. Policies encoded in authentication objects may be used, for example, in embodiments where authentication objects are used to delegate access rights to others, such as described in more detail below. Further, one or more policies may be transmitted (e.g., by a system requiring authentication) to an authentication object manager. The authentication object manager may determine whether an authenticating device complies with the policy and, if applicable, include in authentication object a cryptographically verifiable or other attestation that the device complies with the policy. An attestation to the executable code of the authentication object manager and/or a digital signature of the policy may also be included to ensure that the attestation regarding compliance with policy is accurate. Policies used in such embodiments may specify conditions on one or more security features, such as certain security features being enabled. Example security features include the ability to perform remote data destruction, data destruction after a number of incorrect passcode entry attempts, and/or others.

As illustrated by the lock symbol in FIG. 4, in an embodiment, an authentication object 400 is generated in a secure manner. For example, in an embodiment, an authentication object 400 is generated to be cryptographically verifiable, such as described above. For example, the authentication object 400 or a portion thereof may be encrypted so as to be decryptable by a system to which the authentication object 400 is presented. For example, in an embodiment the authentication object 400 or a portion thereof is encrypted using a public key of a public/private key pair where the private key of the public/private key pair is securely maintained by a system that analyzes the authentication object 400 for verification. The authentication object may be encrypted by the public key itself or in other ways utilizing the public key. For example, a symmetric cryptographic key may be generated and used to encrypt the authentication object 400 and the public key may be used to encrypt the symmetric key. The encrypted symmetric key may be provided as part of the authentication object 400 so that a system that processes the authentication object 400 for the purpose of making authentication decisions may use its copy of the private key corresponding to the public key to decrypt the symmetric key and then use the symmetric key to decrypt the authentication object. Other variations, including encryption of the authentication object 400 using a symmetric cryptographic key maintained as a secret shared between the system that encrypted the authentication object 400 and a system to which the authentication object is presented for verification are also considered as being within the scope of the present disclosure. Further, various embodiments may utilize different layers of encryption and the verification of an authentication object may be performed by a distributed system having multiple components, each of which is able to access some, but not necessarily all, information in the authentication object through decryption.

As discussed above, the authentication object 400 may be cryptographically verifiable in other ways, such as with the use of digital signatures. Some or all of the authentication object 400 may be digitally signed using a key such that a digital signature of the authentication object 400 is verifiable by a system that processes the authentication object for making authentication decisions. In one example, some or all of the authentication object 400 may be digitally signed using a private key of a public/private key pair. A certificate corresponding to the private key may be provided as part of, or otherwise with, the authentication object 400 so that a system processing the authentication object 400, for the purpose of making authentication decisions, may utilize a public key corresponding to the private key and may communicate with a certificate authority to verify the authenticity of the certificate provided. Other variations, including variations in which symmetric cryptographic keys shared between an authentication object manager or otherwise with a computing device on which the authentication object manager operates and the system that verifies authentication objects may be used to encrypt and/or digitally sign some or all of the authentication object 400.

Other variations include variations where different parts of the authentication object 400 are encrypted and/or digitally signed using different keys than discussed above. As one example, as discussed in more detail below, a cryptographic module, such as a TPM, may be used to generate an attestation. The attestation may be digitally signed and/or encrypted by the TPM, utilizing a key securely stored within the TPM and inaccessible to the authentication object manager. A certificate usable to verify this signature may be provided with the authentication object 400 in connection with an attestation. Other portions of the authentication object 400 including or excluding the attestation and/or certificate may be digitally signed and/or encrypted using a key accessible to the authentication object manager. Other variations are also considered as being within the scope of the present disclosure.

Further, it should be noted that data obtained for the authentication object may be obtained by a computer system that generates the authentication object at different times. For example, some long-term alphanumeric credentials 404 may be obtained well in advance of generation of the authentication object 400, such as during a provisioning process of a representation of the authentication object 400. During such a process, the user, for example, may input into an authentication object manager the long-term alphanumeric credentials 404. Other information (long-term and/or short-term credentials, e.g.) may be obtained at different times such as in response to an indication that an authentication object corresponding to a selected representation of the authentication object should be used for authentication. As an example, once a representation of an authentication object is selected for authentication, a graphical user interface may prompt for the input of biometric credentials (e.g., a scan of a biometric trait), a PIN, an OTP code or other information. An authentication object may include information obtained at different times.

Other variations include variations where authentication objects are periodically or aperiodically updated by a background process such that an authentication object that is recent enough to be sufficient for use in authentication is available upon selection of a corresponding representation of the authentication object. The background process may, for example, detect that a stored authentication object or stored information for an authentication object has expired and, as a result, may obtain or prompt to obtain fresh information which may then be stored and/or used to generate an authentication object that is stored for future use.

Figure 5:
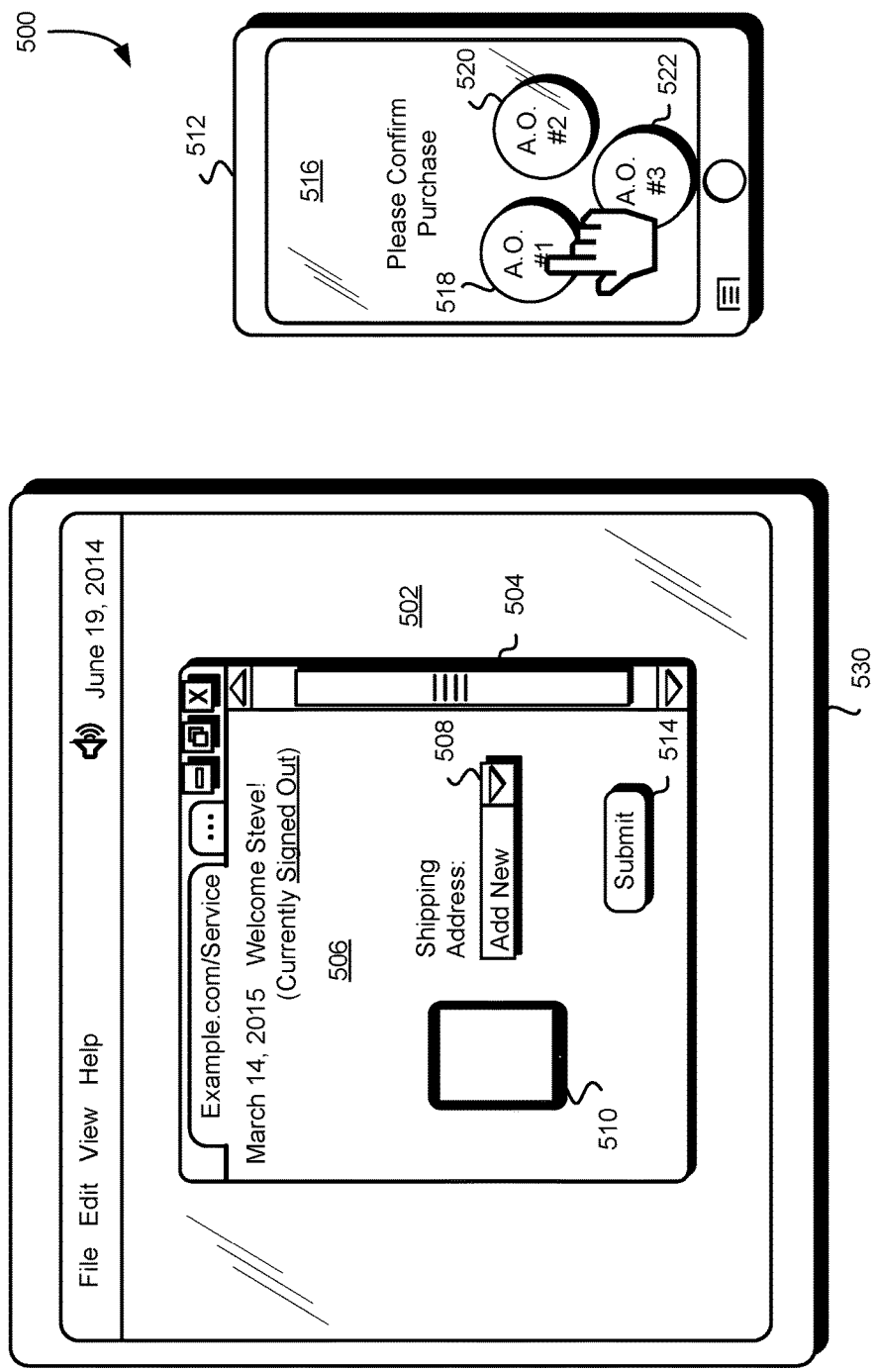
FIG. 5 shows an illustrative example of how a mobile device or other device may be user to provide additional authentication in accordance with at least one embodiment.

The techniques by which authentication objects are usable may vary in accordance with the devices on which an authentication object manager operates or on the device connected to the service provider requiring authentication. FIG. 5, for example, shows an illustrative example of environment 500 of an embodiment enabling use of authentication objects in two factor authentication schemas. An authentication manager may operate on a second device separate from a first device with an application used to gain access (e.g., to a service provider system). The second device may include a mobile device 512 and the first device may include a display device 530, both described in detail below. By selection of a valid authentication object using an interface of the second device, access may become available using the first device. Such functionality may be achieved in various ways, such as by transmission of the authentication object from the second device to the first device over a short-range or other communication channel, thereby enabling the first device to submit the authentication object for authentication, possibly without user input to the first device by the user. The short-range communication channel may be established using various technologies, such as induction wireless, infrared wireless (such as technologies operating according to specifications and protocols provided by the Infrared Data Association, or IrDA) or ultra wideband formats. In some embodiments, the first and second devices may utilize short-range, low-power and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein. Generally, embodiments described herein are not limited to those explicitly illustrated herein. Furthermore, the second device may be configured to transmit the authentication object directly to the service provider or identity provider, as described above in FIG. 3, with or without first transmitting the authentication object to the first device. In such embodiments, an authentication object from the first device and the second device may be required before the service provider enables access to the first device.

The mobile device 512 may be operating in accordance with a corresponding operating system such as a version of an Android operating system, a Windows® phone operating system or an Apple® iOS operating system, although the techniques of the present disclosure are not limited to those operating systems discussed explicitly herein. The mobile device 512 may be the computing device described below in connection with FIG. 9, or may be a computing device incorporating components of the device described above in connection with FIG. 9. For example, the mobile device may be a smartphone or table computing device, although the techniques described in connection with FIG. 5 are not limited to such devices.

The display device 530, which displays a user interface 502 may enable a user to perform various operations. The display device may be, for example, a computer monitor of a notebook or personal computer, a display of a mobile device, a display of a tablet computing device or otherwise a display of a computing device. In an embodiment, the user interface 502 is provided by an operating system of a computing device causing the user interface 502 to be displayed. In the particular example illustrated in FIG. 5, a display of a browser application 504 is displayed on the user interface 502. The browser application 504 may be, for example, as described above. In this particular example, the browser application 504 provides a purchase screen 506 from a web page for display enabling the user to purchase the product 510 shown and select a shipping address from a drop down menu.

The purchase screen 506 may be presented, for example, to enable a user to purchase one or more products 510 or services of a service provider that provides the web page 504 as part of a website. In some embodiments, the user may be able to add a new shipping address 508 as part of purchasing a product or service of the service provider. For various security reasons the service provider may require stronger authentication when performing various operations such as adding a new shipping address 508. Various other operations may require stronger authentication and/or may require varying levels of authentication. For example, adding a shipping address may require two factor authentication wherein the second device (e.g., the mobile device 512) provides an authentication object including a hash of the user's user name and password. However, an operation requiring the transfer of money from the user's account with the service provider to a third party require two factor authentication wherein the second device provides an authentication object including additional information such as information obtained by one or more sensors of the second device as described below in connection with FIG. 8.

In various embodiments, the authentication object manager application may be executing as a background process of the computer system connected to display device 530 with little or no display indicative of the authentication object manager process. The authentication object manager may determine one or more operations the user is attempting to perform that require two factor authentication. The authentication object manager may then cause the computer system to transmit an authentication request to the mobile device 512 executing a second authentication object manager. In some embodiments, the mobile device 512 may be registered with the service provider as a two factor authentication device configured to provide additional and/or stronger authentication. In yet other embodiments, the computing device detects the presences of the mobile device 512 and determines the mobile device is capable of providing additional and/or stronger authentication based at least in part on one or more attributes of the mobile device 512, such as one or more sensors included in the mobile device 512.

As illustrated in FIG. 5, one or more operation performed by the user on the computing device may cause a display to prompt for credentials on the mobile device 512. Accordingly, as illustrated in FIG. 5, one state of the display of the mobile device 1400 may include an authentication screen 516. The authentication screen 516 may, for example, include one or more representations of available authentication objects usable for authentication in various contexts, such as two factor authentication described above. In this example, three authentication objects 518, 520 and 522 are displayed, although there may be greater than three or less than three representations displayed or otherwise available for selection. It should be noted that, as with other embodiments described herein, the authentication objects may appear differently than illustrated in the drawings. For example, a representation of an authentication object may include a logo and/or textual identifier of the service provider (or multiple service providers) for which the authentication object is usable.

In this example, a user may select an authentication object by tapping on the display in an area corresponding to a corresponding representation of the authentication object. In this example, a user taps a first authentication object 518. Other ways of selecting a representation of an authentication object may be used. For example, the display of the mobile device 512 may have a visual indicator (e.g., graphic) of an object for receiving representations of authentication objects (e.g., a graphic of a coin slot or key hole) and a drag and drop operation into the visual indicator may be used for selection of the representation in some embodiments. Generally, any way by which user input to the mobile device 512 can indicate selection of a representation of an authentication object is considered as being within the scope of the present disclosure.

As a result of selection of the representation 418 of the authentication object, the authentication object corresponding to the representation 518 may be submitted to a system for which the authentication screen 516 prompted for credentials. The authentication object manager may, for example, cause an application whose display corresponds to the authentication screen 516 to submit the authentication object to another system for verification. However, as noted above, the authentication object manager may submit the authentication object itself. As a result of the authentication object having been submitted and also being valid, a display of the mobile device 512 may change to show a display enabling access for which authentication was required and for which authentication was provided by submission of the authentication object. The display device 530 may also change to show a display enabling access for which authentication was required. In various embodiments, the display device 530 and/or the mobile device 512 may display a confirmation indicating that the operation attempted by the user has completed successfully. For example, the display device 530 may display an indication to the user that the operation of adding the shipping address, as illustrated in FIG. 5, may proceed as a result of the authentication object submitted by the mobile device 512 being valid.

As with other illustrative examples shown herein, variations are considered as being within the scope of this present disclosure. For instance, in some embodiments, the authentication object generated in accordance with various techniques described herein is formatted so that the authentication object, from the perspective of programming logic of a system verifying the authentication object, is indistinguishable from authentication objects submitted in conventional manners (e.g., authentication objects transmitted upon user input of a username and password and an indication to submit the username and password). For instance, an authentication object may be transmitted with the same information and with the same formatting regardless of whether the authentication object was transmitted due to conventional techniques or techniques described herein. Any distinguishable differences in the authentication objects (e.g., information identifying a technique used to cause transmission of the authentication object) may be included so as to not affect the programming logic of a server that verifies authentication objects. In this manner, an authentication object manager and, generally, techniques described herein are usable without modification to servers that verify authentication objects.

In addition, as discussed above, authentication for the authentication object manager may also be required before authentication objects are made available. Accordingly, a screen may require input of credentials to the authentication object manager before enabling selection from representations of authentication objects. Other operations may serve as sufficient authentication for the authentication object manager. For example, entry of a PIN to unlock the mobile device 512 may be sufficient to enable access to authentication objects through the authentication object manager. Authentication for access to the authentication manager may take place in various ways, which may be user-configurable through one or more settings screens and which may vary in accordance with device capabilities. For example, in some embodiments, a fingerprint scan or image of the user may suffice. In other embodiments, a short-range communication with another device (e.g., card with RFID chip) may enable access to the authentication object manager. In yet other embodiments, manual entry of credentials may be used. Other variations are also considered as being within the scope of the present disclosure.

FIG. 6 illustrates a messaging diagram 600 where one or more computer systems running within a computing resource service provider environment as well as outside a computing resource service provider environment, as well as the associated code running thereon, may, in response to a request, require two factor authentication in order to complete one or more operations. A first device 602 may connect to a service provider 604 and may initiate connection with and/or interaction with one or more applications running on a server of the service provider 604. The first device may be a computing device as described above and may execute a browser application 608 configured to enable access to one or more restricted resources of the service provider 604. Access to at least a portion of the one or more restricted resources of the service provider 604 may require additional authentication such as two factor authentication. Furthermore, operation performed or attempted to be performed by a user may require additional authentication. The second device 606 may provide additional authentication information and/or may be used to perform a two factor authentication operation. The second device may include, for example, the mobile device described above in connection with FIG. 5.

Figure 6A:
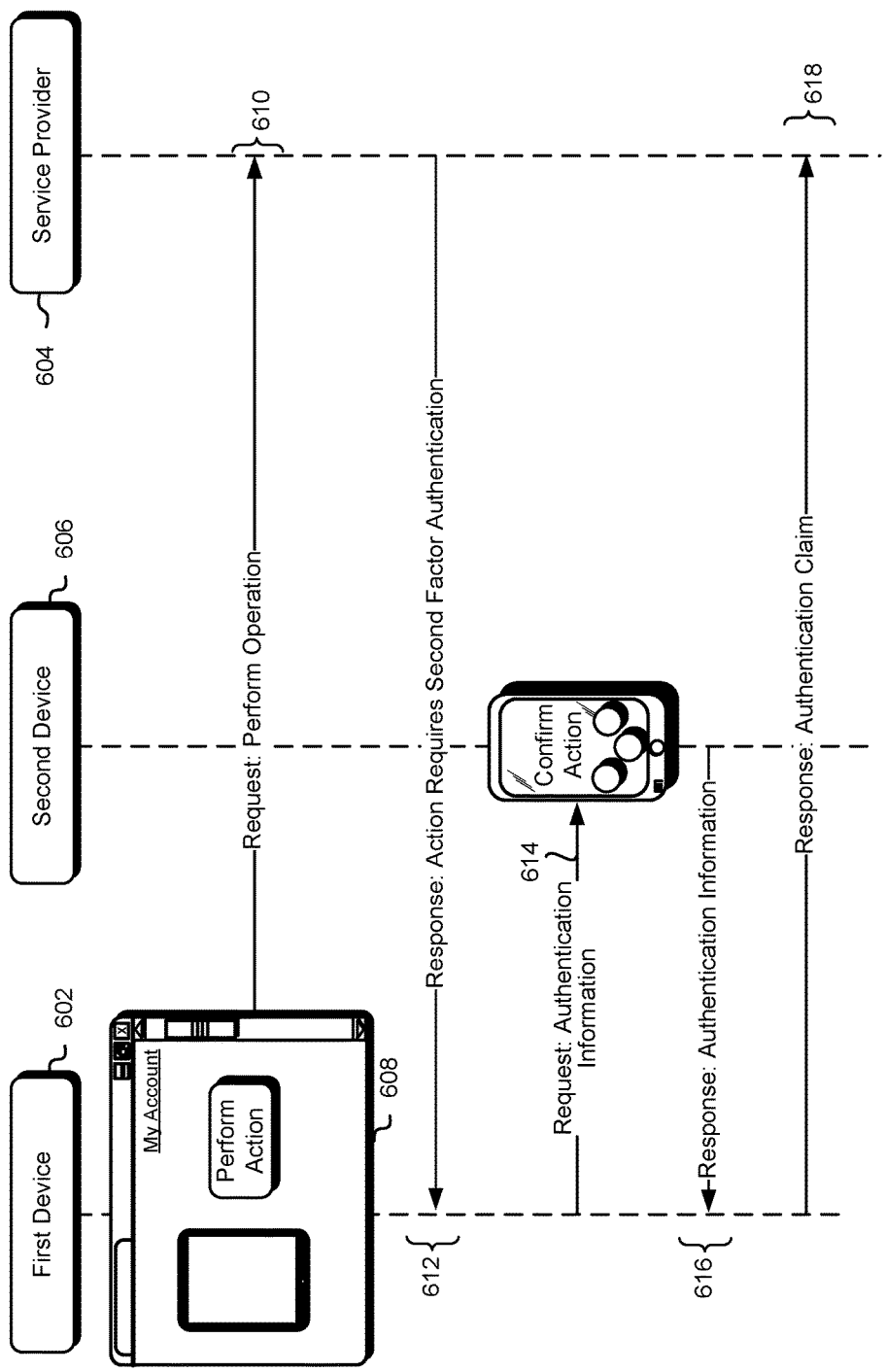
FIGS. 6A and 6B show an illustrative example of messages exchanged during a two factor authentication process in accordance with at least on embodiment.
Figure 6B:
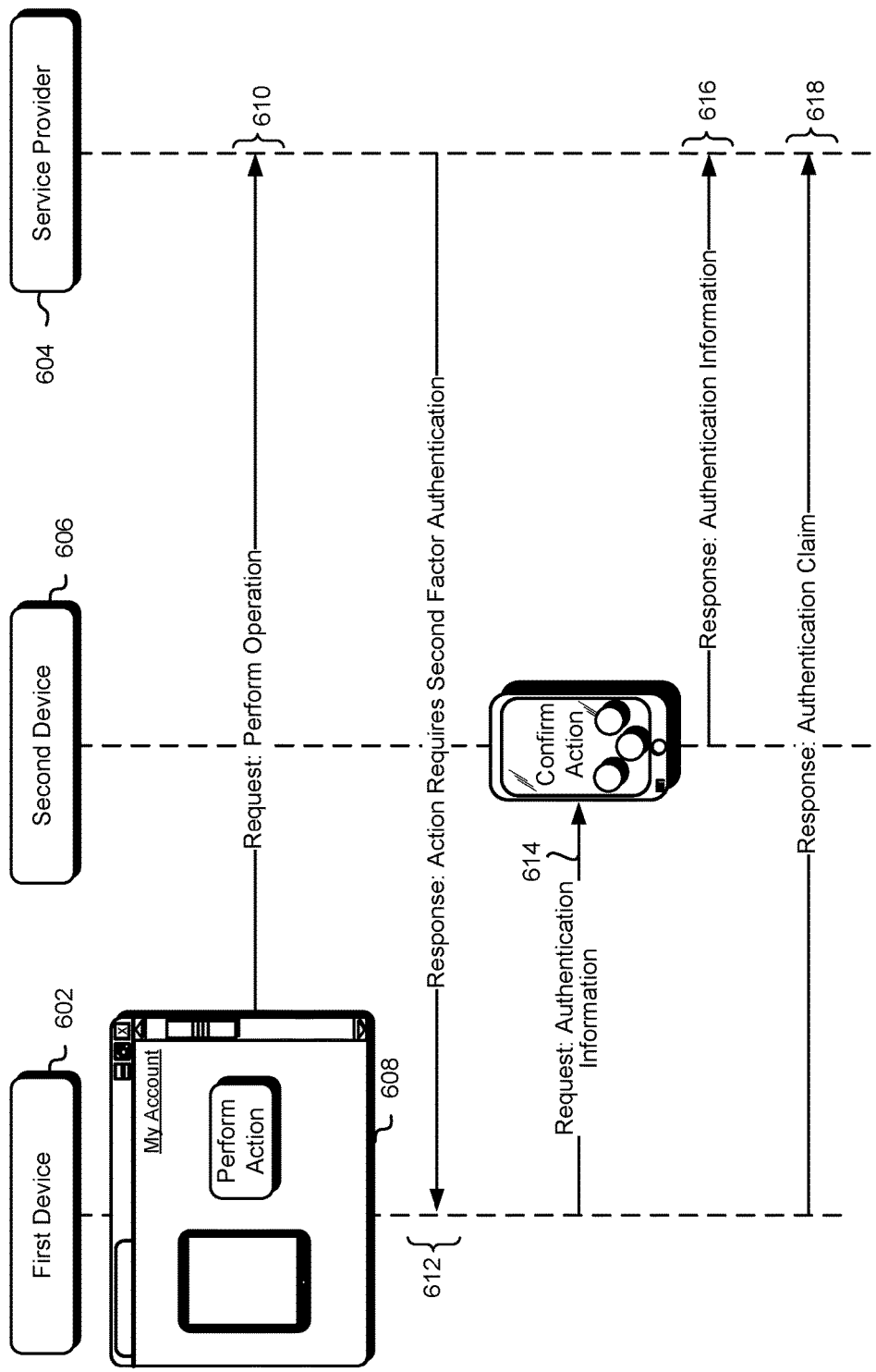

As illustrated in FIGS. 6A and 6B, the user may attempt to perform an action using a browser application 608 executed by the first computing device 602. The attempted operation by the user may cause the first computing device 602 to transmit a request to perform the operation 610 to the service provider 604. For example, the user may attempt to transfer a sum of money from a user account managed by the service provider 604 to a third party using web browser 608. The service provider 604 may be configured such that transfers of money to any third party using a website operated by the service provider 604 requires two factor authentication. The service provider may determine that other operations may require additional authentication, for example, requests received from an unknown and/or untrusted IP addresses may require additional authentication. The service provider 604 may maintain a set of rules or define heuristic configured to enable the service provider 604 to determine whether to require additional authentication and the strength on the authentication required. For example, an operation requiring the transfer of money may require authentication up to a full registration operation in order to be complete. The registration operation may include a set of operations required to be performed by the user using one or more user devices in order to authenticate the user to the service provider 604. For example, the registration operation may include setting a user name and password, providing a fingerprint scan, capturing information suitable for facial recognition. After which authentication of the user may require one or more of the operations performed during the registration operation.

Once the service provider 604 has determined that additional authentication is required, the service provider may return in response to the request to perform the operation 610 a response indicating that additional authentication is required 612. The response may include information indicating the second device 606 capable of providing additional authentication information. In various embodiments, the response indicates one or more sensors or types of sensors or other attributes of a computing device suitable for providing the additional authentication information, the first device 602 then determines a second device meeting the requirements indicated in the response. The first device 602 may then transmit a request for the additional authentication information 614 to the second device 606. The request may be transmitted using NFC as described above. Furthermore, the request may indicate a particular type of authentication information required. For example, the request may indicate that a user name and password are required. In various embodiments, the request may be received directly from the service provider 604 or other entity requiring the additional authentication information.

The second device 606 may prompt the user for authentication information. As illustrated in FIG. 6, the prompt may be configured to generate authentication information suitable for confirming the user action performed on the first computing device 602. The additional authentication information may include an authentication object as described above. Various techniques described herein may be used to enable the authentication manager executed by the second device 606 to receive a user selection of an authentication object and configure the authentication object for use as the additional authentication information. The second device 606 may then transmit a response to the first device including the authentication information 616.

Turning to FIG. 6B, in various embodiments, the second device 606 transmits the authentication object directly to the service provider or other system delegated by the service provider to receive the authentication object. The second device 606 may transmit the authentication object or other authentication information to the service provider 604 and the service provider may transmit an indication to the first user device 602 indicating a result of verifying, by the service provider. Returning to FIG. 6A, the first device may receive the authentication object and provide the authentication object in response 618 to the service provider 604. The service provider may determine the received authentication object is valid and enable the first device 602 access if the authentication object is valid. Furthermore, the first device 602 may modify the authentication object received from the second device 606 before transmitting the authentication object to the service provider 604 for verification.

Figure 7:
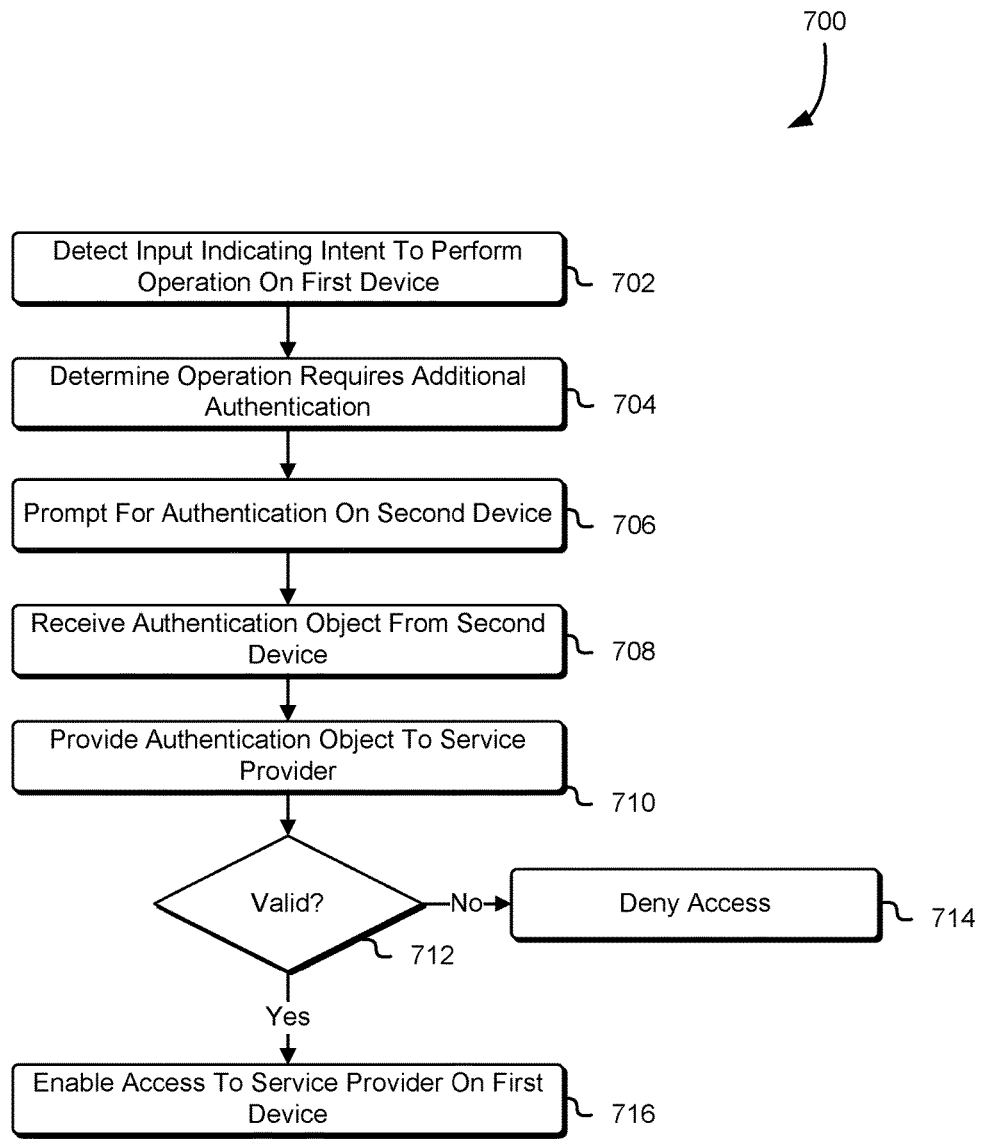
FIG. 7 shows an illustrative example of a process for providing an authentication object using two factor authentication in accordance with at least one embodiment.

FIG. 7 shows an illustrative example of a process 700, which may be used to perform a two factor authentication operation where at least one device executes an authentication object manager in accordance with various embodiments. The process may be performed by any suitable system, such as by a user device described above, or generally, any device that implements an authentication object manager. In an embodiment, the process 700 includes detecting user input indicating an intent to perform an operation using a first device 702. A user interface of the first device, for example, may have been used by a user to select a representation of an operation or portion of an operation the user is attempting to perform. Detecting the user input may include transmitting information from the first device to the service provider. The first device and/or the service provider may then determine the operation attempted to be performed by the user requires additional authentication information 704. As described above, the determination that the operation requires additional authentication information may be based at least in part on a set of rules.

The first device may then cause a prompt to be displayed to the user on a second device 706. In various embodiments, the service provider may directly cause the prompt to be displayed to the user. The second device may be registered with the service provider or may be registered with the authentication object manager executed by the first device. The prompt may be caused to be displayed by an authentication object manager executed by the second device. The prompt may include a notification or other icon to be displayed on the second device, the notification once selected may cause a user interface of the second device to display one or more authentication objects selectable by the user and configured to provide the additional authentication information. Once the user has selected the appropriate authentication object, the second device may transmit the authentication object to the first device and/or the service provider. In various embodiments, the second device may obtain additional information not prompted to the user. For example, the second device may obtain one or more attributes of the environment the second device is in, such as GPS coordinates, local network attributes, accelerometer data and other information collected suitable for authentication.

Returning to process 700, the first device may receive the authentication object from the second device 708. The first device may then modify or convert the authentication object to a format usable by the service provider. The authentication object may then be provided to the service provider 710. The authentication object may be provided over the same or a different connection used to transmit the user request indicating the operation attempted by the user. Once received by the service provider, the service provider may then determine if the authentication object is valid 712. If the authentication object is not valid the service provider may deny the request access 714. For example, the service provider may prevent the execution and/or completion of the operation attempted by the user. The operations attempted by the user may include attempts to access one or more restricted computing resources of the service provider. If the authentication object is valid the service provider may enable access on the first device, the access may be configured to enable the first device to complete the operation attempted to be performed by the user.

Figure 8:
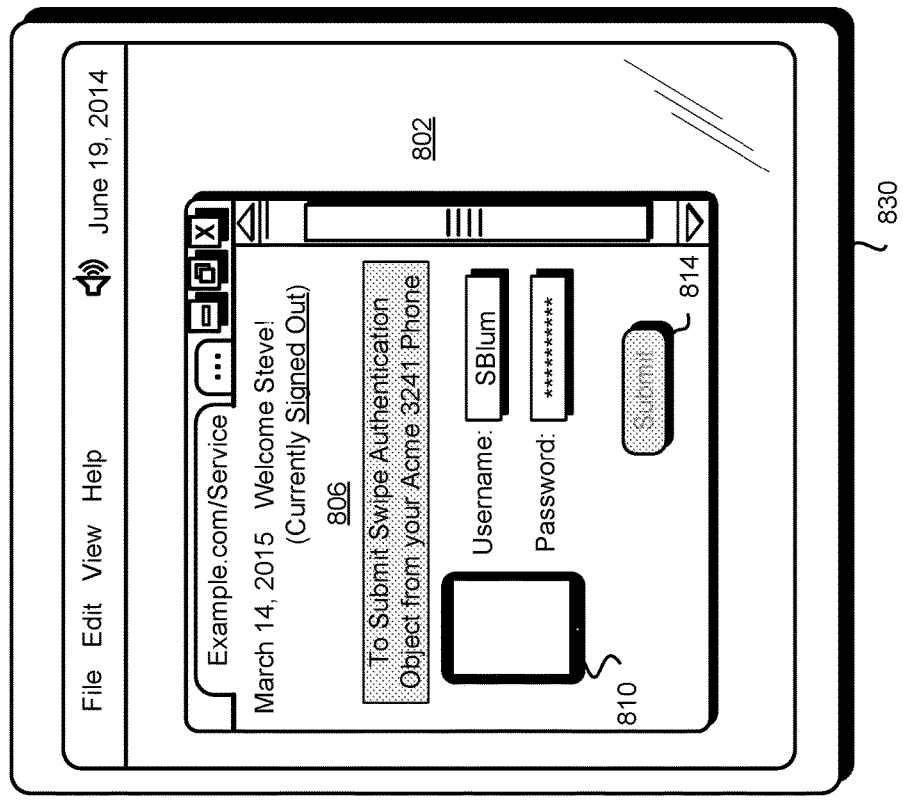
FIG. 8 shows an illustrative example of how a mobile device or other device may be user to provide additional authentication in accordance with at least one embodiment.
Figure 8:
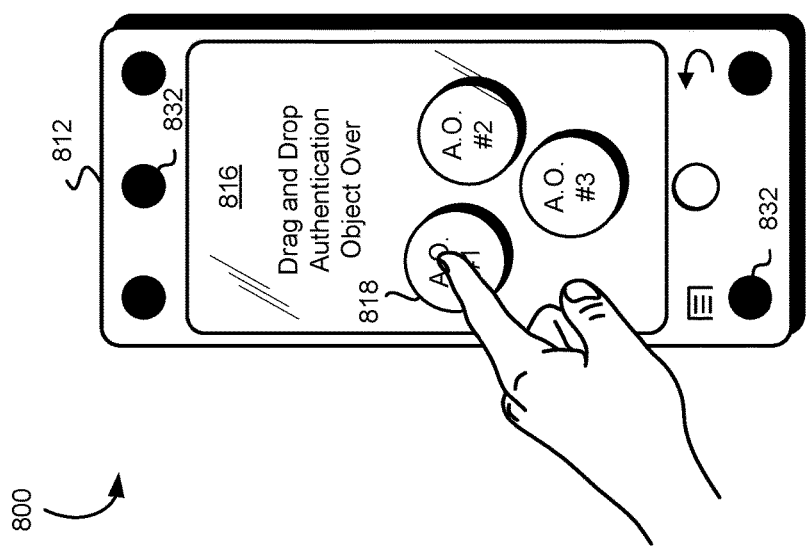

As noted above, the authentication object manager may collect information corresponding to the environment using one or more sensors included in the user device executing the authentication object manager. FIG. 8, for example, shows an illustrative example environment 800 of an embodiment enabling use of one or more sensors to collect information usable in authentication by the authentication object manager. Environment 800 may include a mobile device 812, the mobile device 812 may be the computing device described below in connection with FIG. 9, or may be a computing device incorporating components of the device described above in connection with FIG. 9. For example, the mobile device may be a smartphone or tablet computing device, although the techniques described in connection with FIG. 8 are not limited to such devices. Furthermore, the mobile device 812 may include one or more cameras 832, the cameras 832 may include a flash or other light emitting device such as a light emitting diode (LED). The cameras 832 may be configured to capture information during the execution of one or more operations utilizing the authentication object manager executed by the mobile device 812.

In some embodiments, for example, the user may perform a drag and drop operation of an authentication object 818 onto a web page 806 or a designated area thereof displayed on a display device 830. The display device 830 may be a device as described above in connection with FIG. 5 configured to display information generated by a computer system connected to the display device 830. Returning to FIG. 8, as a result of dragging the authentication object 818 to the web page 806, or another area designated for authentication using authentication objects, one or more operations may occur. In some embodiments, the username and password fields are populated to enable a user to select a buy button 814 to submit the credentials to a system for verification. In other embodiments, the effect of dragging the authentication object 818 into the web page 806, or other area designated for authentication may cause an authentication object corresponding to the authentication object 818 to be submitted without the user having to select the buy button 814, or otherwise indicating (e.g. by pressing an enter key) a submission for authentication. For example, the authentication object manager process may submit the authentication object itself or may call a function of the browser application to cause the browser application to submit the authentication object corresponding to the authentication object 818.

For example, as with other interfaces, instead of automatic submission of an authentication object upon selection of a representation, other operations may occur. For example, upon selection of a representation of an authentication object 818, the webpage 506 may appear with the username field and password field populated to enable the user to select the buy button 814. Selection of the buy button 814 may cause submission of the authentication object 818, which may encode the username and/or password and/or information derived from the username and/or password. In some embodiments, the information submitted upon selection of the buy button 814 may be different depending on whether the user has manually entered credentials or has selected an authentication object. It should be noted that, in some embodiments, the authentication object, whether automatically submitted or submitted as a result of submission of a "submit" or other user interface element may be formatted in various ways in various embodiments.

During the drag and drop operations described above the one or more cameras 832 on the mobile device 812 may capture the movement or other information corresponding to the user and or environment in order to add additional authentication information to the authentication object 818. For example, the cameras 832 may detect the user's hand or other object used to complete the drag and drop operation. Furthermore, the cameras 832 may enable detection of the motion of the user's hand obviating the needs for the screen 816 of the mobile device 812 to be a touch screen. Furthermore, the placement of the authentication object on the screen 816 of the mobile device 812 may be correlated with the location of the user's hand based at least in part on information captured by the cameras 832. For example, the first time the mobile device is used to provide additional authentication information the authentication object 818 is in the upper left of the mobile device's 812 screen 816, the next time the mobile device 812 is used during authentication, the authentication object 818 may be placed in the bottom right on the mobile device's 812 screen 816. The cameras 832 may then be used to determine location of the user's hand during each drag and drop operation and correlated with the location of the authentication object in order to provide stronger authentication. Furthermore, the drag and drop operation or separate authentication process may require the user to drag the authentication object 818 through a particular pattern on the screen 816 of the mobile device 802. The cameras 832 may then track the path taken by the user's finger to ensure that the user traced the correct path. If the mobile device 812 includes a touch screen, the information collected by the cameras 832 may be checked against information collected by the touch screen. Similarly the user may be required to draw their signature on the screen of the mobile device 812 in order to provide additional authentication information.

The cameras 832 may also capture other information from the environment such as the user's face or information displayed and/or outputted by the mobile device 812 or display device 830. For example, the cameras 832 may capture light emitted by the mobile device 812 or display device 830. Furthermore, the service provider may indicate a particular pattern of light, including light in a spectrum not visible to humans, to be displayed by the mobile device 812 or display device 830 and captured by the cameras 832. For example, the authentication object manager executed by the mobile device 812 may cause an infrared LED included in the mobile device 812 to display infrared light in a particular pattern during drag and drop operations. The cameras 832 may then capture the pattern of infrared light and include information corresponding to the captured pattern in the authentication object. In various embodiments, a computing device other than the mobile device 812 may be responsible for capturing the particular pattern of light. For example, the computing device and/or display device 830 may include one or more cameras, the one or more cameras may then capture the light emitted by the mobile device 812. The information captured by the one or more cameras may then be included in the authentication object received from the mobile device 812 or transmitted to the service provider for authentication.

Furthermore, the cameras 832 may be used to capture information useable to detect movement of the authentication object 818, by the user, in three dimensions. The mobile device 812 may also contain a three-dimensional display enabling users to interact with the authentication object in various ways, such as picking up and dropping the authentication object. The mobile device 812 may also perform liveness detection to prevent against various attacks, such as a spoofing attack. For example, the mobile device 812 may turn off the blue image sensor of the cameras 832 and detect the heartbeat of the user if the mobile device 812. The mobile device 812 may using the cameras 832 obtain information corresponding to the computing environment of the mobile device 812 and the display device 830, the information may include any information suitable for authentication the user and/or the computing devices to the service provider. For example, the mobile device 812 may obtain an image of the user's face suitable for facial recognition capable of authenticating the user. Furthermore, the mobile device 812 may provide the service provider with the authentication object 818 capable of authentication the mobile device 812 to the service provider.

Figure 9:
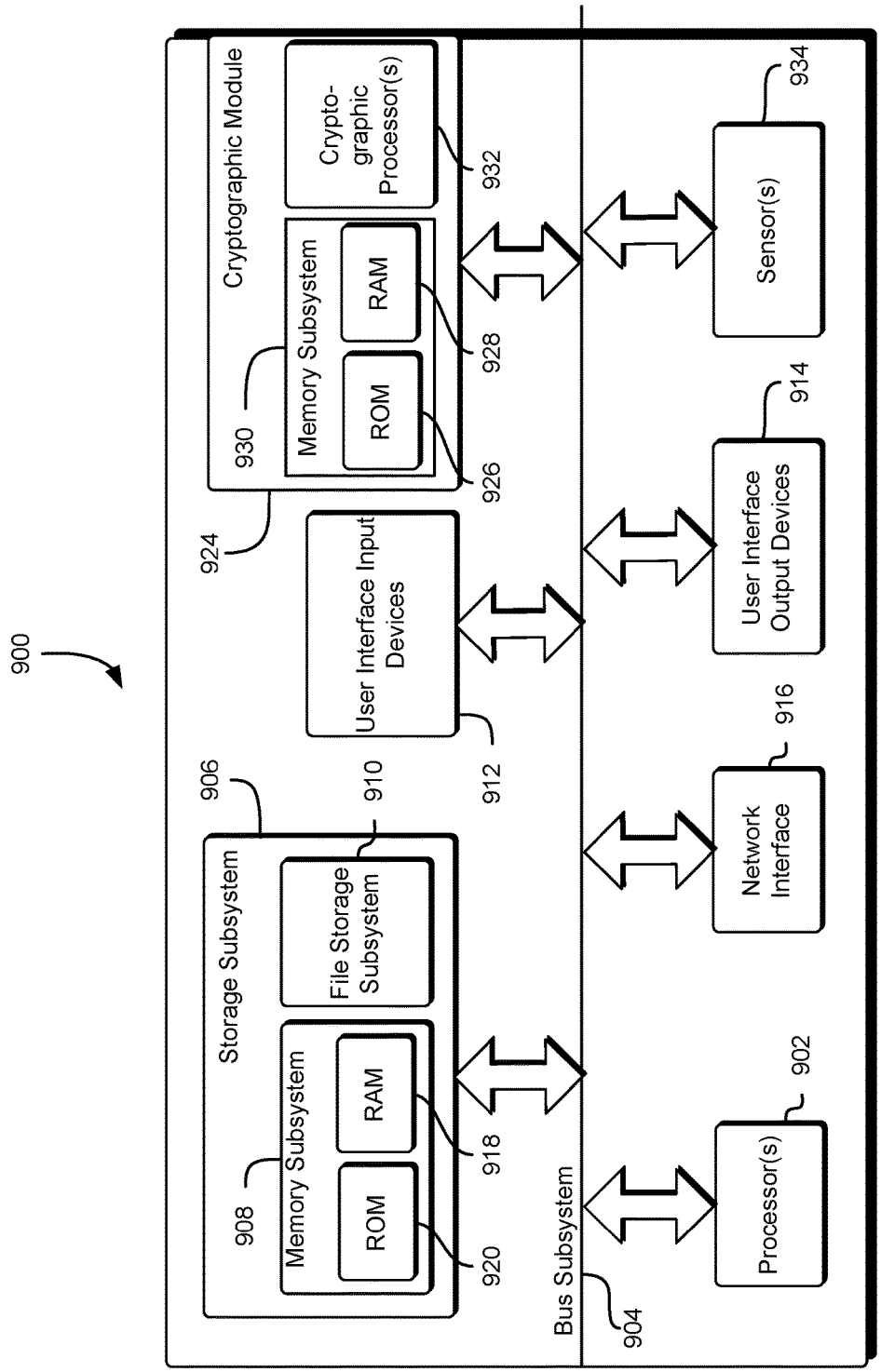
FIG. 9 shows an illustrative example of components of a computing device in accordance with at least one embodiment.

FIG. 9 is an illustrative, simplified block diagram of an example device system 900 that may be used to practice at least one embodiment of the present disclosure. In various embodiments, the device system 900 may be used to implement any of the systems illustrated herein and described above. For example, the device system 900 may be used to implement an authentication object manager and other applications, such as a browser application, in accordance with various embodiments. As shown in FIG. 9, the device 900 may include one or more processors 902 that may be configured to communicate with and are operatively coupled to a number of peripheral subsystems via a bus subsystem 904. These peripheral subsystems may include a storage subsystem 906, comprising a memory subsystem 908 and a file storage subsystem 910, one or more user interface input devices 912, one or more user interface output devices 914, a network interface subsystem 916, a cryptographic module 924, comprising a memory subsystem 930 and one or more cryptographic processors 932. The peripheral subsystems may also include one or more sensors 934 in addition to sensors of input devices 912. Such sensors may include, but are not limited to, GPS sensors, accelerometers, temperature sensors and others.

The bus subsystem 904 may provide a mechanism for enabling the various components and subsystems of device system 900 to communicate with each other as intended. Although the bus subsystem 904 is shown schematically as a single bus, alternative embodiments of the bus subsystem may utilize multiple busses.

The network interface subsystem 916 may provide an interface to other device systems and networks. The network interface subsystem 916 may serve as an interface for receiving data from and transmitting data to other systems from the device system 900. For example, the network interface subsystem 916 may enable transmission of authentication objects and other information, such as electronic requests to access a system (e.g., receive a webpage) and may enable receipt of responses to the requests, such as webpages or other information. The network interface subsystem 916 may also facilitate the receipt and/or transmission of data on other networks, such as an organizations intranet and/or other networks described below.

The user interface input devices 912 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in generating an authentication object, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 900.

User interface output devices 914, if any, may include a display subsystem, a printer or non-visual displays, such as audio and/or tactile output devices, etc. Generally, the output devices 914 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 900. The output device(s) 914 may be used, for example, to present user interfaces to facilitate user interaction with applications performing processes described herein and variations therein, when such interaction may be appropriate. While a device 900 with user interface output devices is used for the purpose of illustration, it should be noted that the device 900 may operate without an output device, such as when the device 900 is operated in a server rack and, during typical operation, an output device is not needed.

The storage subsystem 906 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 906. These application modules or instructions may be executed by the one or more processors 902. The storage subsystem 906 may additionally provide a repository for storing data used in accordance with the present disclosure. The storage subsystem 906 may comprise a memory subsystem 908 and a file/disk storage subsystem 910.

The cryptographic module 924, which may be a trusted platform module (TPM), includes a memory subsystem 930, including a main random access memory (RAM) 928 for storage of instructions and data during program execution and a read only memory (ROM) 926, in which fixed cryptographic information may be stored, such as a hardware secret stored securely within the device 900 so as to be non-exportable (i.e., inaccessible through any call to the cryptographic module 924). The cryptographic module 924, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 900 may also store cryptographic keys in RAM 928 and/or processor registers for temporary cryptographic processing. The cryptographic information stored in memory may be used in combination with cryptographic information obtained via the network interface 916 and/or one or more of the user interface input devices 912. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for authentication objects.

As noted above, in various embodiments of the present disclosure, hardware secrets are securely stored within the cryptographic module 924. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 10:
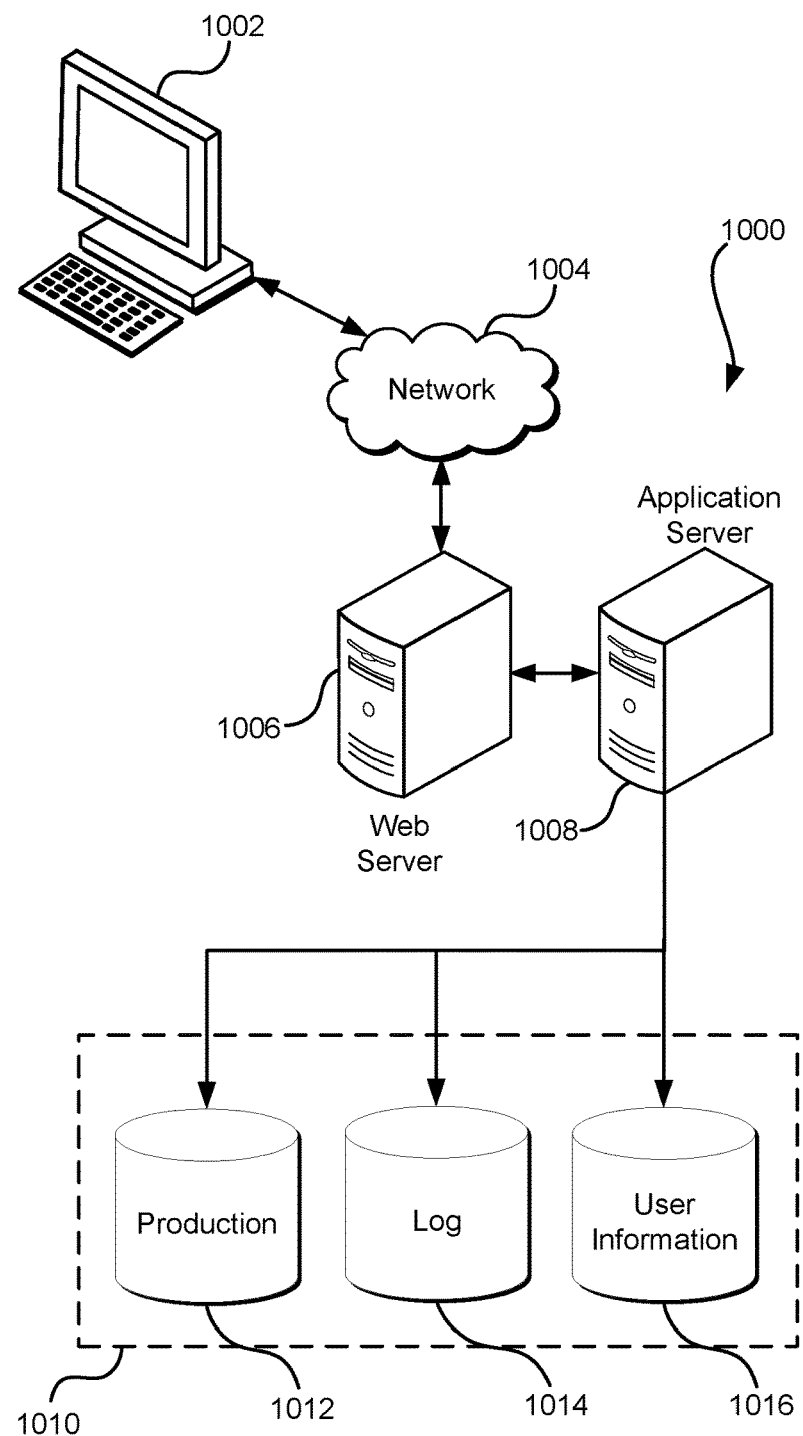
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a first device, a request to authenticate an identity;
   providing, on a second device, a graphical user interface that makes an authentication object available for selection, the graphical user interface including graphical representations of sets of actions for authenticating by corresponding service provider systems, including a graphical representation that represents a set of actions for authenticating the identity by a service provider system, wherein the authentication object encodes:
      a set of credentials usable to authenticate the identity; and
      an access policy that specifies a permitted use or a restriction on use of the authentication object; and
   is associated with a set of actions for authenticating the identity;
   receiving, from the second device, user input indicating selection of the authentication object; and
   performing the set of actions by at least:
      obtaining an authentication claim generated based at least in part on the request from the first device and the set of credentials encoded in the authentication object selected from the second device; and
      causing, at least in part by providing the authentication claim to a computing resource service provider system, the authentication claim to be used to authenticate the identity.

2. The computer-implemented method of claim 1, wherein the graphical user interface further comprises a plurality of graphical representations corresponding to at least a portion of the set of actions.

3. The computer-implemented method of claim 2, wherein obtaining the authentication claim further comprises:
   determining information corresponding to a state of an environment where the first device is located; and
   providing the information corresponding to the state of the environment to the second device.

4. The computer-implemented method of claim 1, wherein performing the set of actions further comprises obtaining information associated with a state of a computing network to which the first device is connected.

5. The computer-implemented method of claim 1, wherein the authentication object further encodes an attestation of a computing environment of the second device.

6. The computer-implemented method of claim 1, wherein the authentication object further encodes an attestation of sensor data of the second device.

7. The computer-implemented method of claim 1, wherein:
   the graphical user interface makes the authentication object available for selection via drag-and-drop of a graphical representation of the authentication object; and
   the user input indicates a drag-and-drop selection of the authentication object.

8. A system, comprising:
   one or more computing devices including one or more processor and memory, the memory including executable instructions that, as a result of execution by the one or more processors, cause the system to:
      receive, from a first computing device of the one or more computing devices, a request to authenticate an identity;
      receive, from a second computing device of the one or more computing devices, an authentication object usable to authenticate the identity to a service provider system, the authentication object selected via a graphic interface including graphical representations of sets of actions for authenticating by corresponding systems including the service provider system, the authentication object encoding:
  a set of credentials sufficient to authenticate the identity to a service provider system; and
  a policy that specifies a type of access associated with the authentication object;
generate, based at least in part on the set of credentials encoded in the authentication object, an authentication claim that corresponds to the request from the first computing device; and
provide the authentication claim to the service provider system to facilitate performance of an operation involving interaction with the service provider system.

9. The system of claim 8, wherein the authentication object is associated with a set of actions performable to provide the authentication claim to enable performance of the operation involving the service provider system.

10. The system of claim 9, wherein the first computing device performs the set of actions to cause the authentication claim to be provided to the second computing device.

11. The system of claim 10, wherein the set of actions includes obtaining information corresponding to a physical environment associated with the one or more computing devices using one or more sensors.

12. The system of claim 11, wherein obtaining the information corresponding to a physical environment includes obtaining an image capture of the second computing device.

13. The system of claim 8, wherein providing the authentication claim to the second computing device further comprises transmitting the authentication claim using near field communication methods wherein providing the authentication claim to the second computing device further comprises transmitting the authentication claim using a near field communication method.

14. The system of claim 8, wherein the memory further includes instructions that, a result of execution by the one or more processors, cause the system to determine a second operation of at least one computing devices of the one or more computing devices requires authentication with the service provider system.

15. The system of claim 14, wherein the memory further includes instructions that, when a result of execution the one or more processors, cause the system to transmit a notification to the first computing device indicating the second operation of the at least one computing devices of the one or more computing devices requires authentication with the service provider system.

16. A non-transitory computer-readable storage medium having stored thereon executable instructions that, as a result of execution by one or more processors of a first computer system, cause the first computer system to at least:
  cause, as a result of an attempt by the first computer system to access a resource of a service provider, a graphical user interface to be displayed on a second computer system, the graphical user interface including a plurality of graphical representations including a graphical representation that represents a set of actions for authenticating an identity by a service provider system, at least a portion of the plurality of graphical representations being associated with:
    a set of actions for authenticating the identity with a service provider;
    a set of policies specifying permitted uses or restrictions associated with the plurality of graphical representations; and
    a set of credentials usable to authenticate the identity with the service provider;
  generate, based at least in part on the set of credentials received as a result of a selection from the plurality of graphical representations made via the second computer system, an authentication claim sufficient to authenticate with the service provider; and
  access the resource of the service provider at least in part by providing the authentication claim to the service provider for authentication.

17. The non-transitory computer-readable storage medium of claim 16, wherein the executable instructions further comprise instructions that cause the first computer system to:
  receive a request for additional authentication information from a second computer system;
  provide the additional authentication information by at least displaying an indication of one or more user actions to perform in order to confirm an operation of the second computer system; and
  detect performance of at least one user action of the one or more user actions.

18. The non-transitory computer-readable storage medium of claim 17, wherein the executable instructions that cause the first computer system to detect performance of the at least one user action further include instructions that cause the first computer system to detect performance of the at least one user action by at least capturing information displayed on a display device of the second computer system.

19. The non-transitory computer-readable storage medium of claim 17, wherein the executable instructions further comprise instructions that, as a result of receiving the request for additional authentication information, cause the first computer system to obtain information corresponding to an environment associated with the second computer system.

20. The non-transitory computer-readable storage medium of claim 19, wherein the executable instructions that cause the first computer system to access the resource of the service provider further include instructions that cause the first computer system to include in the authentication claim the information corresponding to the environment associated with the second computer system.

21. The non-transitory computer-readable storage medium of claim 16, wherein the executable instructions further include instructions that cause the first computer system to determine, using information obtained using one or more sensors of the second computer system, a state of the second computer system.

22. The non-transitory computer-readable storage medium of claim 21, wherein the executable instructions that cause the first computer system to determine the state of the second computer system further include instructions that cause the first computer system to obtain biometric information using the one or more sensors.

23. The non-transitory computer-readable storage medium of claim 22, wherein executable the instructions that cause the first computer system to determine the state of the second computer system further include instructions that cause the first computer system to obtain network information using the one or more sensors.

* * * * *